US009633313B2

(12) United States Patent
Svore et al.

(10) Patent No.: US 9,633,313 B2
(45) Date of Patent: Apr. 25, 2017

(54) METHOD AND SYSTEM THAT IMPLEMENT A V-GATE QUANTUM CIRCUIT

(71) Applicant: Microsoft Corporation, Redmond, WA (US)

(72) Inventors: Krysta Svore, Redmond, WA (US); Guillaume Duclos-Cianci, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 736 days.

(21) Appl. No.: 13/948,171

(22) Filed: Jul. 23, 2013

(65) Prior Publication Data

US 2014/0264288 A1 Sep. 18, 2014

Related U.S. Application Data

(63) Continuation-in-part of application No. 13/830,006, filed on Mar. 14, 2013, now Pat. No. 9,269,052.

(51) Int. Cl.
*G06N 99/00* (2010.01)
*B82Y 10/00* (2011.01)

(52) U.S. Cl.
CPC .......... *G06N 99/002* (2013.01); *B82Y 10/00* (2013.01)

(58) Field of Classification Search
CPC ................. B82Y 10/00; G06N 99/002
USPC ....................................... 977/933
See application file for complete search history.

(56) References Cited

U.S. PATENT DOCUMENTS

| 6,301,029 B1 | 10/2001 | Azuma | |
|---|---|---|---|
| 7,359,513 B2 | 4/2008 | Gisin et al. | |
| 7,653,199 B2 | 1/2010 | Renes | |
| 8,350,587 B2 * | 1/2013 | Zubairy | H03K 19/195 326/3 |
| 2003/0055513 A1 * | 3/2003 | Raussendorf | G06N 99/002 700/1 |
| 2004/0119061 A1 * | 6/2004 | Wu | B82Y 10/00 257/9 |

(Continued)

OTHER PUBLICATIONS

Kliuchnikov, et al., "Fast and Efficient Exact Synthesis of Single Qubit Unitaries Generated by Clifford and T Gates", Retrieved at <<http://arxiv.org/pdf/1206.5236.pdf>>, In Quantum Information and Computation, vol. 13, Aug. 20, 2012, pp. 22.

(Continued)

*Primary Examiner* — Matthew Sandifer
(74) *Attorney, Agent, or Firm* — Klarquist Sparkman, LLP

(57) ABSTRACT

The current application is directed to methods and quantum circuits that prepare qubits in specified non-stabilizer quantum states that can, in turn, be used for a variety of different purposes, including in a quantum-circuit implementation of an arbitrary single-qubit unitary quantum gate that imparts a specified, arbitrary rotation to the state-vector representation of the state of an input qubit. In certain implementations, the methods and systems consume multiple magic-state qubits in order to carry out probabilistic rotation operators to prepare qubits with state vectors having specified rotation angles with respect to a rotation axis. These qubits are used as resources input to various quantum circuits, including the quantum-circuit implementation of an arbitrary single-qubit unitary quantum gate, including a V gate.

18 Claims, 38 Drawing Sheets

(56) References Cited

U.S. PATENT DOCUMENTS

| | | | | |
|---|---|---|---|---|
| 2004/0264898 | A1* | 12/2004 | Munro | B82Y 10/00 385/122 |
| 2010/0251049 | A1 | 9/2010 | Goto et al. | |
| 2012/0159272 | A1* | 6/2012 | Pesetski | B82Y 10/00 714/724 |
| 2012/0210111 | A1* | 8/2012 | Ozols | G06N 99/002 713/1 |
| 2014/0026107 | A1 | 1/2014 | Bocharov et al. | |
| 2014/0118024 | A1* | 5/2014 | Eastin | G06N 99/002 326/7 |

OTHER PUBLICATIONS

Trung, et al., "Optimising the Solovay-Kitaev Algorithm", Retrieved at <<http://arxiv.org/pdf/1209.4139.pdf>>, In arXiv Preprint, arXiv: 1209.4139, Sep. 19, 2012, pp. 9.

Carnahan, Caitlin., "A Quantum Compiler for Topological Quantum Computation", Retrieved at <<http://diginole.lib.fsu.edu/cgi/viewcontent.cgi?article=1063&context=uhm>>, in Honors Theses, Paper 96, Florida State University, Jan. 4, 2012, pp. 37.

Hubbard, Adam., "On Magic State Distillation using Nuclear Magnetic Resonance", Retrieved at <<http://libdspace.uwaterloo.ca/bitstream/10012/3554/1/ah_thesis_corrected.pdf>>, in Thesis, University of Waterloo, Ontario, Canada, Jan. 25, 2008, pp. 90.

Reichardt, Ben W., "Quantum Universality by State Distillation", Retrieved at <<http://arxiv.org/pdf/quant-ph/0608085v2.pdf>>, In Journal of Quantum Information & Computation, vol. 9, Issue 11, Nov. 2009, pp. 24.

Campbell, Earl T., "Catalysis and Activation of Magic States in Fault Tolerant Architectures", Retrieved at <<http://arxiv.org/pdf/1010.0104.pdf>>, In Physical Review A, vol. 83, Issue 3, Mar. 25, 2011, pp. 13.

Bravyi, et al., "Universal Quantum Computation with Ideal Clifford Gates and Noisy Ancillas", Retrieved at <<http://authors.library.caltech.edu/1053/1/BRApra05.pdf>>, In Journal of Physical Review A 71, Feb. 22, 2005, pp. 14.

Meier, et al., "Magic-State Distillation with the Four-Qubit Code", Retrieved at http://arxiv.org/pdf/1204.4221v1.pdf>>, Apr. 18, 2012, pp. 10.

Bocharov, et al., "A Depth-Optimal Canonical Form for Single-Qubit Quantum Circuits", Retrieved at <<http://arxiv.org/pdf/1206.3223v1.pdf>>, Jun. 14, 2012, pp. 10.

Fowler, et al., "High Threshold Universal Quantum Computation on the Surface Code", Retrieved at <<http://arxiv.org/pdf/0803.0272v4.pdf>>, In Journal of Physical Review A 80, Dec. 2, 2009, pp. 18.

Office action from U.S. Appl. No. 13/830,006, dated Apr. 30, 2015, 6 pages.

\* cited by examiner

| | |
|---|---|
| $G_0$ | Id |
| $G_1$ | H |
| $G_2$ | HSSH |
| $G_3$ | SS |
| $G_4$ | S |
| $G_5$ | SSS |
| $G_6$ | HSS |
| $G_7$ | SSH |
| $G_8$ | SH |
| $G_9$ | SSSH |
| $G_{10}$ | SSHSSH |
| $G_{11}$ | SHSSH |
| $G_{12}$ | SSSHSSH |
| $G_{13}$ | HS |
| $G_{14}$ | HSSS |
| $G_{15}$ | SSHSS |
| $G_{16}$ | SHSS |
| $G_{17}$ | SSSHSS |
| $G_{18}$ | HSH |
| $G_{19}$ | HSSSH |
| $G_{20}$ | HSHSSH |
| $G_{21}$ | HSSSHSSH |
| $G_{22}$ | SSSHS |
| $G_{23}$ | SHSSS |

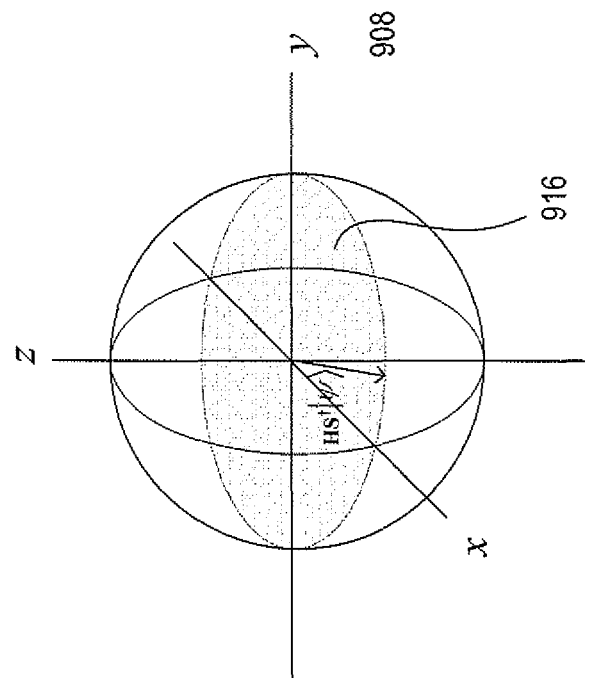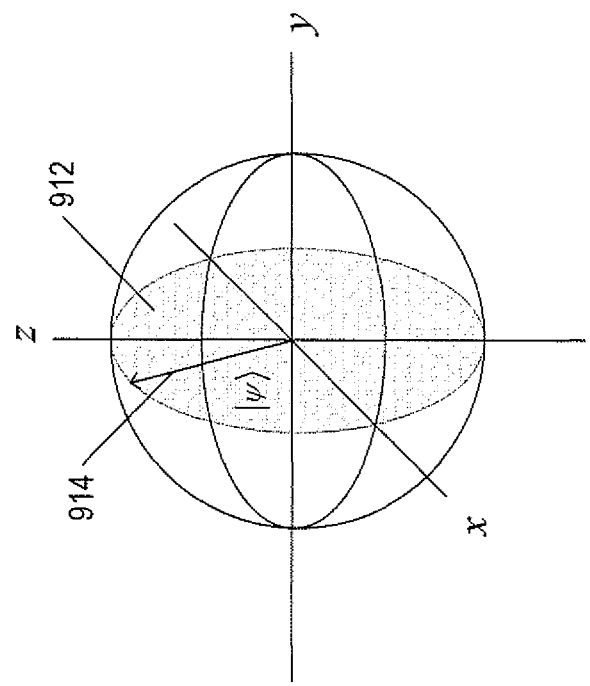
FIG. 9B

| $i$ | $\theta$ | $i$ | $\theta$ |
|---|---|---|---|
| 0 | $7.853 \times 10^{-1}$ | 9 | $2.974 \times 10^{-4}$ |
| 1 | $3.398 \times 10^{-1}$ | 10 | $1.232 \times 10^{-4}$ |
| 2 | $1.419 \times 10^{-1}$ | 11 | $5.102 \times 10^{-5}$ |
| 3 | $5.886 \times 10^{-2}$ | 12 | $2.113 \times 10^{-5}$ |
| 4 | $2.439 \times 10^{-2}$ | 13 | $8.753 \times 10^{-6}$ |
| 5 | $1.010 \times 10^{-2}$ | 14 | $3.626 \times 10^{-6}$ |
| 6 | $4.184 \times 10^{-3}$ | 15 | $1.502 \times 10^{-6}$ |
| 7 | $1.733 \times 10^{-3}$ | 16 | $6.221 \times 10^{-7}$ |
| 8 | $7.179 \times 10^{-4}$ | 17 | ... |

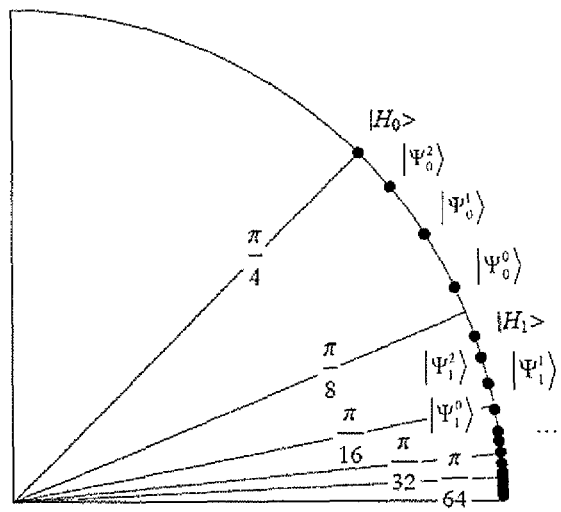

FIG. 19

| $i$ | subsystem 1 | subsystem 2 | subsystem 3 | subsystem 4 |
|---|---|---|---|---|
| 0 | $7.853 \times 10^{-1}$ | $4.456 \times 10^{-1}$ | $5.698 \times 10^{-1}$ | $6.898 \times 10^{-1}$ |
| 1 | $3.398 \times 10^{-1}$ | $1.871 \times 10^{-1}$ | $2.415 \times 10^{-1}$ | $2.954 \times 10^{-1}$ |
| 2 | $1.419 \times 10^{-1}$ | $7.770 \times 10^{-2}$ | $1.004 \times 10^{-1}$ | $1.231 \times 10^{-1}$ |
| 3 | $5.886 \times 10^{-2}$ | $3.220 \times 10^{-2}$ | $4.162 \times 10^{-2}$ | $5.105 \times 10^{-2}$ |
| 4 | $2.439 \times 10^{-2}$ | $1.334 \times 10^{-2}$ | $1.724 \times 10^{-2}$ | $2.115 \times 10^{-2}$ |
| 5 | $1.010 \times 10^{-2}$ | $5.525 \times 10^{-3}$ | $7.142 \times 10^{-3}$ | $8.761 \times 10^{-3}$ |
| 6 | $4.184 \times 10^{-3}$ | $2.288 \times 10^{-3}$ | $2.959 \times 10^{-3}$ | $3.629 \times 10^{-3}$ |
| 7 | $1.733 \times 10^{-3}$ | $9.479 \times 10^{-4}$ | $1.225 \times 10^{-3}$ | $1.503 \times 10^{-3}$ |
| 8 | $7.179 \times 10^{-4}$ | $3.926 \times 10^{-4}$ | $5.076 \times 10^{-4}$ | $6.226 \times 10^{-4}$ |

FIG. 20

METHOD AND SYSTEM THAT IMPLEMENT A V-GATE QUANTUM CIRCUIT

CROSS-REFERENCE TO RELATED APPLICATION

This application is a continuation-in-part of U.S. application Ser. No. 13/830,006, filed Mar. 14, 2013.

TECHNICAL FIELD

The current application is directed to quantum computing and, in particular, to a method and system for producing specified non-stabilizer quantum states and for using the non-stabilizer quantum states to implement various types of quantum circuits and quantum systems.

BACKGROUND

Enormous advances have been made in digital computing over the past 70 years. Crude, high-energy-consuming, vacuum-tube-based computer systems developed in the 1940s have evolved into today's personal computers, work stations, servers, and high-end distributed computer systems, based on multi-core single-integrated-circuit processors, that economically provide processing speeds, data-storage capacities, and data-transfer bandwidths that were unimaginable even 20 years ago. However, digital computing appears to be bounded by certain physical and problem-domain constraints.

With regard to physical constraints, processing speeds and data-storage capacities are generally inversely related to the minimum sizes at which transistors and other circuit elements can be fabricated within integrated circuits. Much of the exponential growth observed in computational bandwidth for various classes of computer systems can be attributed to a corresponding decrease in feature sizes within integrated circuits. There are, however, fundamental physical limits, on the order of the sizes of complex molecules, past which feature sizes cannot be further decreased, and somewhat larger feature-size limitations past which further decreases in feature sizes can be obtained only by exponentially increasing integrated-circuit cost.

With regard to problem-domain constraints, while digital computers provide the basis for practical and cost-effective solutions of many types of computational problems, there are many types and classes of computational problems that appear incapable of being addressed efficiently by digital computer systems. Examples include accurate simulation of the quantum-mechanical behavior of large molecules and aggregations of molecules and a variety of traditional numerical and computational problems, including large-integer factoring and graph-isomorphism problems.

In 1982, Richard Feynman made a suggestion for a new type of computational system based on quantum-mechanical components. He suggested that quantum computers could more efficiently address certain classes of computational problems than digital computers and, in the case of computational problems in computational chemistry and physics, provide practical approaches to computational problems that are intractable using digital computer systems. Since that time, great progress has been made in developing the theoretical foundation for quantum computing and the first quantum computers have been implemented. Various computational problems have been identified that can be addressed more efficiently by quantum computers than by classical digital computers. However, significant research and development efforts continue to be applied in order to provide practical and cost-effective general-purpose quantum-computing systems for widespread use. As one example, significant theoretical efforts are currently being applied to identify practical and cost-effective implementations of quantum circuits.

SUMMARY

The current application is directed to methods and quantum circuits that prepare qubits in specified non-stabilizer quantum states that can, in turn, be used for a variety of different purposes, including in a quantum-circuit implementation of an arbitrary single-qubit unitary quantum gate that imparts a specified, arbitrary rotation to the state-vector representation of the state of an input qubit. In certain implementations, the methods and systems consume multiple magic-state qubits in order to carry out probabilistic rotation operators to prepare qubits with state vectors having specified rotation angles with respect to a rotation axis. These qubits are used as resources input to various quantum circuits, including the quantum-circuit implementation of an arbitrary single-qubit unitary quantum gate, including a V gate. Neither this section nor the sections which follow are intended to either limit the scope of the claims which follow or define the scope of those claims.

BRIEF DESCRIPTION OF THE DRAWINGS

FIGS. 7A-B illustrate the single-qubit Clifford group.

FIGS. 9A-B each illustrate two portions of two planes inscribed within the Bloch sphere and an operation that rotates a vector $|\psi\rangle$ from the xz Bloch-sphere plane to the xy Bloch-sphere plane.

FIG. 19 illustrates the θ angles available from quantum-circuit subsystems based on FIGS. 12-13 and 16-18, using the illustration conventions of FIG. 15.

FIG. 20 provides a table of the θ angles of xz-Bloch-sphere plane state vectors, in radians, produced by the first nine stages of each of the various types of quantum-circuit subsystems discussed above.

DETAILED DESCRIPTION

It should be noted, at the onset, that although the current application employs mathematical notation and control-flow diagrams, the current application is directed to physical and tangible quantum circuits, methods and systems for producing designs for quantum circuits that are stored in physical data-storage devices and systems, including optical disks within optical-disk drives, magnetic disks within magnetic-disk drives, electronic memories within computer systems, and other such physical, tangible data-storage devices, and to classical-computing control logic that executes within a classical computer to control operation of a quantum computer. These are physically instantiated devices and device-control subsystems.

In the current application, the methods and systems to which the current application is directed are described using block diagrams, control-flow diagrams, and mathematical expressions. As those familiar with modern science and technology well appreciate, a quantum gate, a classical-computing control program, and systems that carry out operations that produce state changes in qubits are physical and tangible systems that produce physical changes within subsystems and within their environments. Even the storage and retrieval of computer instructions and computer designs involve physical changes within the physical data-storage components of one or more systems. These physical changes, like all physical changes, can be described in terms of thermodynamic state variables, including enthalpy and entropy, and occur over time intervals. It is common to describe the control of physical processes, including the operation of computer systems, using mathematical expressions and/or actual computer code or pseudocode. However, these representations are employed to describe physical processes associated with physical changes within a computer system controlled by computer instructions as well as within other objects and systems that electronically communicate with the computer system.

The following discussion includes five different subsections: (1) Overview of Digital Computer Systems; (2) Overview of Quantum Computing; (3) A Quantum circuit that Produces Non-stabilizer Qubit States; (4) Implementation of a Universal Qubit Rotation Operator; and (5) V-gate Implementation. The final two subsections discuss the methods and systems to which the current application is directed. Those familiar with classical and quantum computing may wish to proceed to the final three subsections.

Overview of Digital Computer Systems

Figure 1:
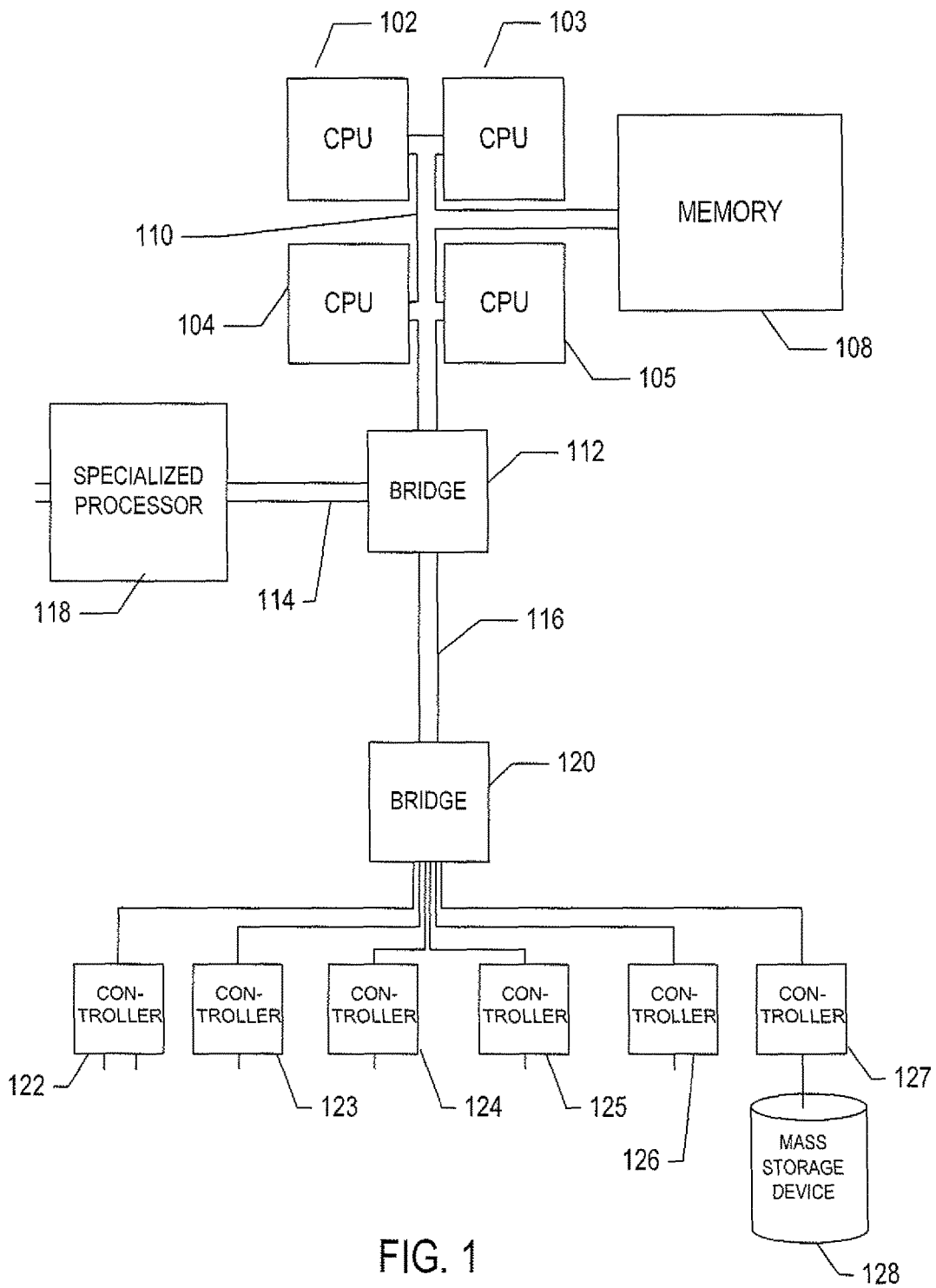
FIG. 1 provides an architectural diagram for a generalized digital computer that may implement control components of a quantum computing system.

FIG. 1 provides an architectural diagram for a generalized digital computer that may implement control components of a quantum computing system. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116 or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. Digital computer systems store and manipulate information represented as binary numbers, or digits, of various lengths and are controlled by digitally encoded instructions stored in one or more memories and executed by one or more processors.

Overview of Quantum Computing

FIGS. 2A-D illustrate a quantum bit, referred to as a "qubit," which is a fundamental data-storage unit of many quantum-computing systems. The qubit is a quantum-computing analog of a classical digital-computer-system bit. A classical bit is considered to occupy, at any given point in time, one of two possible states corresponding to the binary digits "0" and "1." Of course, the classical bit is a high-level abstraction of a hardware implementation of the classical bit and, at the molecular level, the transistors and other circuit components and wiring that together compose a classical bit have an essentially infinite number of quantum-mechanical states. Nonetheless, the complex quantum-mechanical states of a hardware implementation of a classical bit fall into two discrete and measurable subspaces that, in the aggregate, correspond to two discrete and distinguishable macroscopic states corresponding to binary digits "0" and "1."

By contrast, a qubit is implemented in hardware by tiny, physical components with quantum-mechanical characteristics that are generally contained within macroscopic subsystems. These tiny physical components can have an infinite number of different quantum-mechanical states. When the state of a qubit is physically measured, the measurement produces one of two different basis states $|0\rangle$ and $|1\rangle$. The quantum-mechanical state of a qubit is represented as a state vector that represents a superposition of the two states $|0\rangle$ and $|1\rangle$:

$$|\psi\rangle = \alpha|0\rangle + \beta|1\rangle,$$

where $\alpha$ and $\beta$ are complex numbers and $|\alpha|^2 + |\beta|^2 = 1$. The qubit state vector can be represented in vector notation as:

$$|\psi\rangle = \begin{bmatrix} \alpha \\ \beta \end{bmatrix}.$$

The choice of vector representations of the states $|0\rangle$ and $|1\rangle$ is somewhat arbitrary, but to facilitate mathematical operations, these two vectors are generally chosen to be orthonormal representations of eigenstates of a physical system, and are often assigned the vector representations:

$$|0\rangle = \begin{bmatrix} 1 \\ 0 \end{bmatrix},$$

$$|1\rangle = \begin{bmatrix} 0 \\ 1 \end{bmatrix}.$$

In the Dirac notation, $|\rangle$ is referred to as the "ket" notation for vectors of an inner-product vector space. This inner-product vector space has a dual inner-product vector space, the vectors of which are represented by the Dirac bra notation $\langle|$. The corresponding dual-inner-product vector space vectors for the above-discussed qubit state vectors are:

$$\langle\psi| = [\alpha^*, \beta^*],$$

$$\langle 0| = [1,0],$$

$$\langle 1| = [0,1],$$

where $\alpha^*$ is the complex conjugate of $\alpha$. The magnitude of a qubit state vector is computed as the square root of the inner product of the state vector and its corresponding dual state vector:

$$\|\langle\psi\|\| = \sqrt{\langle\psi|\psi\rangle},$$
$$= \sqrt{\alpha\alpha^* + \beta\beta^*},$$
$$= 1.$$

Thus, state vectors used to describe qubit states are normalized to have a magnitude of 1, which is indicated by the "normal" syllable of the term "orthonormal." The "ortho" syllable refers to the fact that the state vectors $|0\rangle$ and $|1\rangle$ are chosen to be orthogonal, to simplify various operations, including taking inner products. Note that, by one convention, kets are represented by columns vectors and bras by row vectors. A complex row vector multiplied by a complex column vector, as in the above expression for the square root of the inner product of the state vector $|\psi\rangle$, produces a real number, while a column vector multiplied by a row vector produces a generally complex-valued matrix.

The quantum-mechanical state $|\psi\rangle$ of a qubit is not directly observable by measurement. Instead, physical measurement operations are performed on a qubit to produce a measured state in a computational basis, such as the basis $|0\rangle$ or $|1\rangle$. The measurement operations can be represented as 2×2 matrices $M_0$ and $M_1$:

$$M_0 = |0\rangle\langle 0| = \begin{bmatrix} 1 & 0 \\ 0 & 0 \end{bmatrix},$$

$$M_1 = |1\rangle\langle 1| = \begin{bmatrix} 0 & 0 \\ 0 & 1 \end{bmatrix}.$$

The probability that a measurement of a qubit in state $|\psi\rangle$ will return a state $|0\rangle$ or $|1\rangle$ is obtained by the inner product:

$$p_m = \langle\psi|M_m^\dagger M_m|\psi\rangle,$$

where m is 0 or 1, corresponding to a measurement that produces $|0\rangle$ or $|1\rangle$, respectively. For example, the probability $p_0$ that a measurement of the state of a qubit in state $|\psi\rangle$ produces $|0\rangle$ is obtained as:

$$p_0 = \langle\psi|M_0^\dagger M_0|\psi\rangle,$$
$$= [\alpha^*, \beta^*]\begin{bmatrix} 1 & 0 \\ 0 & 0 \end{bmatrix}\begin{bmatrix} \alpha \\ \beta \end{bmatrix}$$
$$= \alpha\alpha^*$$
$$= |\alpha|^2.$$

By a similar computation:

$$p_1 = |\beta|^2.$$

Thus, the squares of the magnitudes of the coefficients $\alpha$ and $\beta$ in the expression $|\psi\rangle = \alpha|0\rangle + \beta|1\rangle$ correspond to the probabilities that a measurement of a qubit in state $|\psi\rangle$ will produce states $|0\rangle$ and $|1\rangle$, respectively.

Figure 2A:
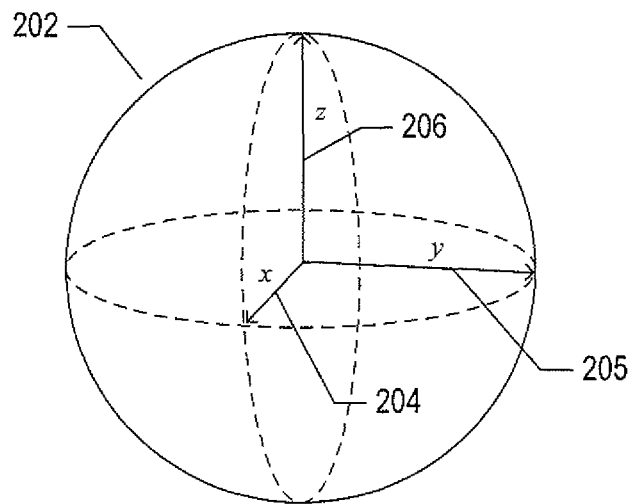
FIGS. 2A-D illustrate a quantum bit, referred to as a "qubit," which is a fundamental data-storage unit of many quantum-computing systems.
Figure 2B:
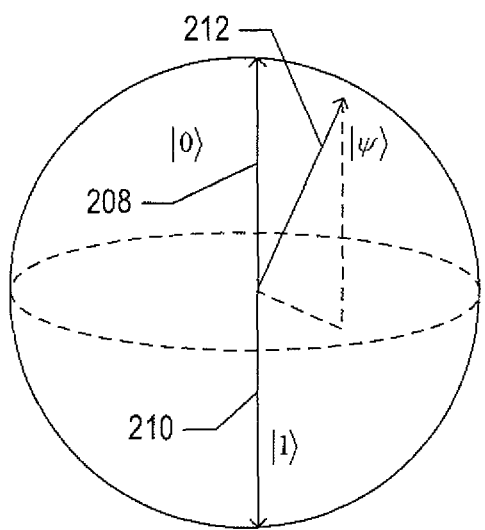

FIG. 2A shows a unit sphere 202 centered within a Cartesian coordinate system with orthonormal spatial axes x 204, y 205, and z 206. The surface of this unit sphere represents possible qubit state vectors $|\psi\rangle$ with unit modulus, analogous to the circle of an Argand diagram, discussed below, that represents complex numbers of unit modulus. FIG. 2B shows an arbitrary qubit state vector $|\psi\rangle$ within the unit sphere shown in FIG. 2A. The vector of unit magnitude collinear with the positive z axis 208 is arbitrarily chosen to represent state vector $|0\rangle$ and the vector of unit magnitude co-linear with the negative z axis 210 is chosen to represent state vector $|1\rangle$. Pairs of points at which a line passing through the origin intersects the unit sphere correspond to orthogonal state vectors. An arbitrary single-qubit state vector $|\psi\rangle$ 212 is a linear combination of the two computational basis state vectors $|0\rangle$ and $|1\rangle$, as expressed by $|\psi\rangle = \alpha|0\rangle + \beta|1\rangle$, and can thus be any vector that can be inscribed within the unit sphere, with the particular vector corresponding to $|\psi\rangle$ depending on the values of coefficients $\alpha$ and $\beta$. The representation of the state of a qubit shown in FIG. 2B is referred to as a Bloch sphere.

Figure 2C:
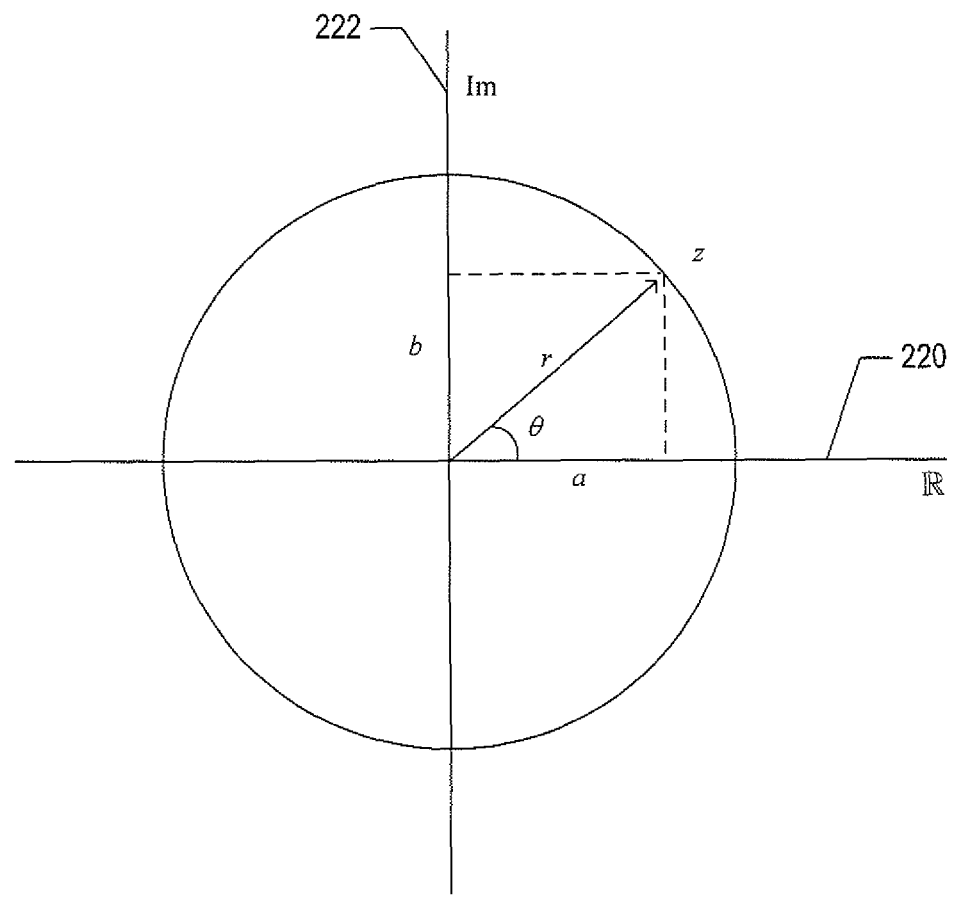

FIG. 2C shows the Argand diagram frequently used to illustrate various ways to represent a complex number. The horizontal axis 220 represents the real numbers and the vertical axis 222 represents the imaginary numbers. The general expression for a complex number z is:

$$z = a + ib,$$

where a and b are real numbers and $i = \sqrt{-1}$. Because $$a = r\cos\theta,$$

$$b = r\sin\theta,$$

as shown in FIG. 2C, the complex number z can be alternatively expressed in polar form as:

$$z = r(\cos\theta + i\sin\theta),$$
$$= re^{i\theta},$$
$$= e^{i\theta} \text{ for } |r| = 1.$$

Figure 2D:
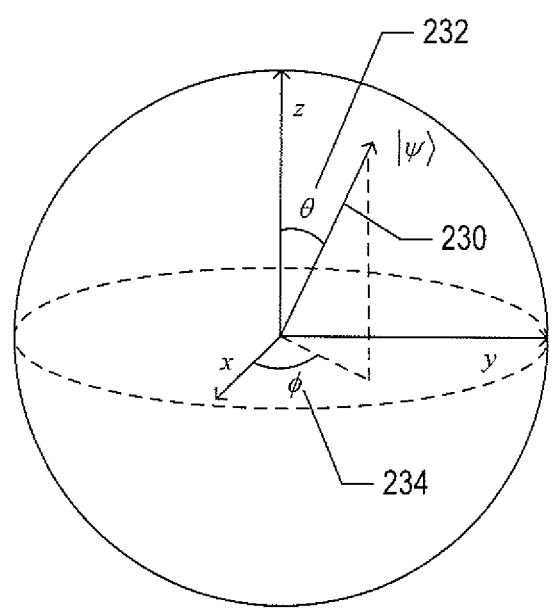

FIG. 2D shows a complete representation of the Bloch sphere for an arbitrary state vector $|\psi\rangle$. The state vector $|\psi\rangle$ 230 can be specified with two angles θ 232 and θ 234. Using the polar form for the complex coefficients α and β, state vector $|\psi\rangle$ can be expressed as:

$$|\psi\rangle = r_\alpha e^{i\phi_\alpha}|0\rangle + r_\beta e^{i\phi_\beta}|1\rangle.$$

As previously discussed, the squares of the magnitudes of the coefficients α and β correspond to the probabilities that a measurement of a qubit in state $|\psi\rangle$ will return state vectors $|0\rangle$ and $|1\rangle$, respectively. The state vector $|\psi\rangle$ can be multiplied by an arbitrary complex number with unit modulus, $e^{i\gamma}$, without changing the magnitudes of the squares of the coefficients α and β, as shown by:

$$e^{i\gamma}|\psi\rangle = e^{i\gamma}r_\alpha e^{i\phi_\alpha}|0\rangle + e^{i\gamma}r_\beta e^{i\phi_\beta}|1\rangle,$$

$$|e^{i\gamma}r_\alpha e^{i\phi_\alpha}|^2 = e^{i\gamma}r_\alpha e^{i\phi_\alpha}e^{-i\gamma}r_\alpha e^{-i\phi_\alpha} = r_\alpha^2 = |\alpha|^2,$$

$$|e^{i\gamma}r_\beta e^{i\phi_\beta}|^2 = |\beta|^2.$$

Thus, there is a global phase-shift degree of freedom in the expression of a state vector that does not affect the measurable properties associated with the state.

The state vector $|\psi\rangle$ can alternately be expressed, using the Bloch-sphere angles shown in FIG. 2D, as:

$$|\psi\rangle = \cos\frac{\theta}{2}|0\rangle + e^{i\phi}\sin\frac{\theta}{2}|1\rangle.$$

A derivation of this expression from the previously presented expression $|\psi\rangle = r_\alpha e^{i\phi_\alpha}|0\rangle + r_\beta e^{i\phi_\beta}|1\rangle$ for the state vector $|\psi\rangle$ follows:

$$e^{-i\phi_\alpha}|\psi\rangle = e^{-i\phi_\alpha}r_\alpha e^{i\phi_\alpha}|0\rangle + e^{i\phi_\alpha}r_\beta e^{i\phi_\beta}|1\rangle,$$
$$= r_\alpha|0\rangle + r_\beta e^{i(\phi_\beta - \phi_\alpha)}|1\rangle$$
$$= r_\alpha|0\rangle + r_\beta e^{i\phi}|1\rangle,$$

$$|\psi\rangle = r_\alpha|0\rangle + r_\beta e^{i\phi}|1\rangle,$$

$$x = r\sin\theta'\cos\varphi,$$

$$y = r\sin\theta'\sin\varphi,$$

$$z = r\cos\theta',$$

$$r = 1, r_\alpha \to z,$$

$$|\psi\rangle = \cos\theta'|0\rangle + e^{i\phi}\sin\theta'|1\rangle,$$

$$\theta = 2\theta',$$

$$|\psi\rangle = \cos\left(\frac{\theta}{2}\right)|0\rangle + e^{i\phi}\sin\left(\frac{\theta}{2}\right)|1\rangle.$$

The derivation uses a global phase factor to remove a phase coefficient from one of the terms and then employs spherical coordinate representations of the orthonormal axes x, y, and z as well as several substitutions to produce the final expression.

In the current discussion, a qubit is treated as a mathematical object with the above-described properties. However, these mathematically-described qubits correspond to actual physical hardware qubits that can be implemented using any of a number of different physical implementations, including trapped ions, optical cavities, and individual elementary particles, molecules, or aggregations of molecules that exhibit qubit behavior.

Various different primitive operations, corresponding to logic circuits in a digital computer and to computer instructions that control operation of logic circuits, can be performed on classical bits to produce classical bits with possibly altered state values. These primitive operations are referred to as "gates." For example, when a signal corresponding to the state of a first bit is passed through a NOT gate and stored in a second classical bit, the state of the second classical bit is opposite from the state of the first classical bit. In fact, the NOT gate is the only fundamental, non-trivial, traditional, classical computing gate with a single-bit input and a single-bit output. By contrast, there are an infinite number of possible single-qubit quantum gates that change the state of a qubit. As can be seen in FIG. 2D, changing the state of a qubit changes the Block-sphere representation of the state. This change is generally viewed either as a rotation of the Block-sphere itself, generally resulting in a change of the basis vectors of the state vector, or is viewed as a rotation of the state vector within the Block sphere, generally resulting in a change of the coefficients of the state vector. Changing the state vector of a qubit is therefore referred to as a "rotation." A rotation, state change, or single-qubit quantum-gate operation is represented mathematically by a unitary 2×2 matrix with complex elements:

$$\begin{bmatrix} a & b \\ -b^* & a^* \end{bmatrix},$$

where a and b are complex numbers and the notation "x*" indicates the complex conjugate of x. A unitary 2×2 matrix U with complex elements can be defined as a 2×2 matrix U with the following property:

$$U'U = UU^\dagger = I = \begin{bmatrix} 1 & 0 \\ 0 & 1 \end{bmatrix},$$

where $U^\dagger = \begin{bmatrix} a^* & -b \\ b^* & a \end{bmatrix}.$

The adjoint $U'$ of a unitary matrix U is the complex-conjugate transpose of the unitary U and is the inverse of U, denoted $U^{-1}$. The fact that multiplication of the adjoint unitary operation by the unitary operation, or vice versa, produces the identity operator Id, or identity matrix I, can be seen by:

$$\begin{bmatrix} a^* & -b \\ b^* & a \end{bmatrix}\begin{bmatrix} a & b \\ -b^* & a^* \end{bmatrix} = \begin{bmatrix} a^*a + bb^* & a^*b - ba^* \\ ab^* - ab^* & bb^* + aa^* \end{bmatrix} = \begin{bmatrix} 1 & 0 \\ 0 & 1 \end{bmatrix},$$

since $$a^*a + bb^* = |a|^2 + |b|^2 = 1$$

Thus, the operation of a quantum gate on a qubit with state $|\psi\rangle$, where $|\psi\rangle$ is expressed in vector form as $$|\psi\rangle = \begin{bmatrix} \alpha \\ \beta \end{bmatrix},$$

can be expressed as left-hand multiplication of the state vector by the unitary matrix corresponding to the unitary operation:

$$\begin{bmatrix} a & b \\ -b^* & a^* \end{bmatrix} \begin{bmatrix} \alpha \\ \beta \end{bmatrix} = \begin{bmatrix} a\alpha + b\beta \\ -b^*\alpha + a^*\beta \end{bmatrix} = \begin{bmatrix} \alpha' \\ \beta' \end{bmatrix}.$$

In the current discussion, quantum gates and quantum circuits are generally single-qubit quantum gates and quantum circuits, and therefore are assumed to have 2×2 complex matrix representations.

Figure 3:
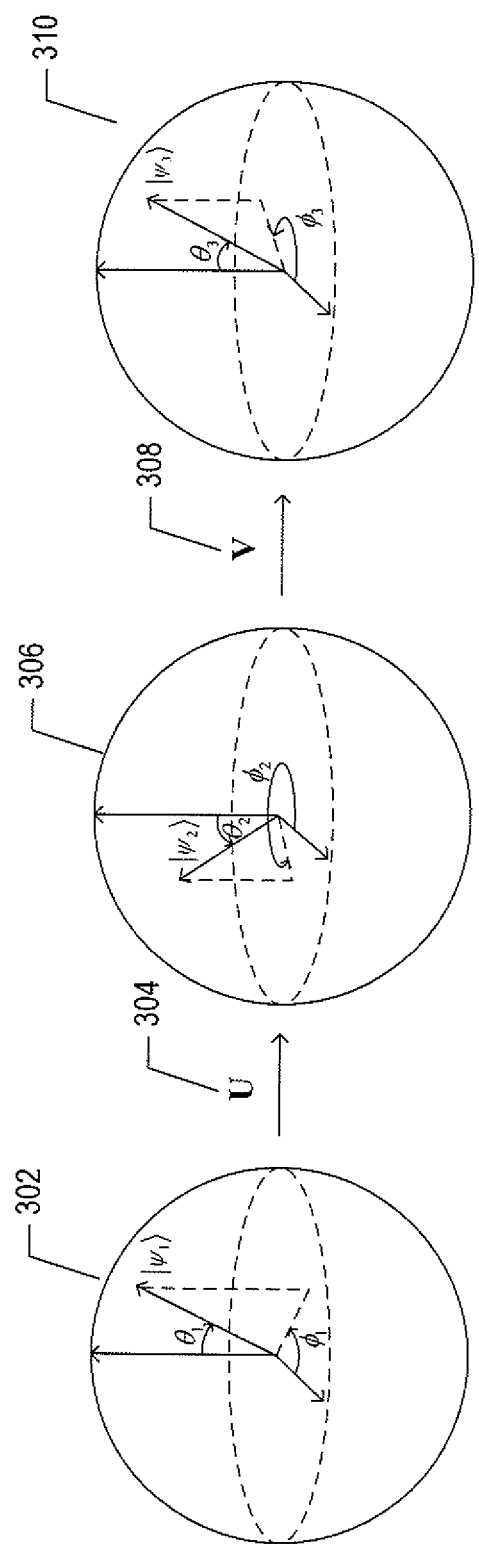
FIG. 3 illustrates a quantum circuit comprising two quantum gates.

FIG. 3 illustrates a quantum circuit comprising two quantum gates. In FIG. 3, a qubit in a first state $|\psi_1\rangle$, represented by the Bloch sphere 302, is transformed by unitary operation U 304 to a qubit in state $|\psi_2\rangle$, as represented by Bloch sphere 306, which is, in turn, transformed by unitary operation V 308 to place the qubit in state $|\psi_3\rangle$, as represented by Bloch sphere 310. This quantum circuit can be represented as the gate sequence UV which transforms the qubit as follows:

$$\overset{U}{\begin{bmatrix} U_{11} & U_{12} \\ U_{21} & U_{22} \end{bmatrix}} \overset{|\psi_1\rangle}{\begin{bmatrix} \alpha_1 \\ \beta_1 \end{bmatrix}} \to \begin{bmatrix} U_{11}\alpha_1 + U_{12}\beta_1 \\ U_{21}\alpha_1 + U_{22}\beta_1 \end{bmatrix} = \overset{=|\psi_2\rangle}{\begin{bmatrix} \alpha_2 \\ \beta_2 \end{bmatrix}},$$

$$\overset{V}{\begin{bmatrix} V_{11} & V_{12} \\ V_{21} & V_{22} \end{bmatrix}} \overset{|\psi_2\rangle}{\begin{bmatrix} \alpha_2 \\ \beta_2 \end{bmatrix}} \to \begin{bmatrix} V_{11}\alpha_2 + V_{12}\beta_2 \\ V_{21}\alpha_2 + V_{22}\beta_2 \end{bmatrix} =$$

$$\begin{bmatrix} V_{11}(U_{11}\alpha_1 + U_{12}\beta_1) + V_{12}(U_{21}\alpha_1 + U_{22}\beta_1) \\ V_{21}(U_{11}\alpha_1 + U_{12}\beta_1) + V_{22}(U_{21}\alpha_1 + U_{22}\beta_1) \end{bmatrix} = \overset{=|\psi_3\rangle}{\begin{bmatrix} \alpha_3 \\ \beta_3 \end{bmatrix}}.$$

Alternatively, one can multiply the two matrices representing operations U and V together to produce matrix W, and then left-hand multiply state vector $|\psi_1\rangle$ by W to produce the same result:

$$\overset{U}{\begin{bmatrix} U_{11} & U_{12} \\ U_{21} & U_{22} \end{bmatrix}} \overset{V}{\begin{bmatrix} V_{11} & V_{12} \\ V_{21} & V_{22} \end{bmatrix}} = \overset{W}{\begin{bmatrix} U_{11}V_{11} + U_{12}V_{21} & U_{11}V_{12} + U_{12}V_{22} \\ U_{21}V_{11} + U_{22}V_{21} & U_{21}V_{12} + U_{22}V_{22} \end{bmatrix}},$$

$$\overset{W}{\begin{bmatrix} U_{11}V_{11} + U_{12}V_{21} & U_{11}V_{12} + U_{12}V_{22} \\ U_{21}V_{11} + U_{22}V_{21} & U_{21}V_{12} + U_{22}V_{22} \end{bmatrix}} \overset{|\psi_1\rangle}{\begin{bmatrix} \alpha_1 \\ \beta_1 \end{bmatrix}} =$$

$$\begin{bmatrix} \alpha_1(U_{11}V_{11} + U_{12}V_{21}) + \beta_1(U_{11}V_{12} + U_{12}V_{22}) \\ \alpha_1(U_{21}V_{11} + U_{22}V_{21}) + \beta_1(U_{21}V_{12} + U_{22}V_{22}) \end{bmatrix} = \overset{|\psi_3\rangle}{\begin{bmatrix} \alpha_3 \\ \beta_3 \end{bmatrix}}.$$

A quantum circuit can therefore be specified as a sequence of quantum gates in which the quantum gates are symbolically represented or, equivalently, numerically represented. There are several ways to look at a quantum circuit. One can, as discussed above, multiply the matrices corresponding to the component quantum gates together in the order specified by the symbol sequence to produce a final, resultant, 2×2 complex matrix that represents the same state change, in a single operation or quantum gate, corresponding to the state change produced by sequential application of the quantum gates specified in the original symbol sequence. A quantum circuit can be viewed as a design for an actual hardware circuit in a quantum computer, where the hardware circuit needs to perform the operation specified by the single-gate representation of the quantum circuit, or can be viewed as a quantum-computing program, in which operations corresponding to the sequence of quantum gates represented by the symbol sequence are applied to a qubit in order to produce a final qubit state.

The term "quantum circuit" is thus somewhat interchangeable with the term "quantum gate," as a quantum circuit can be expressed as a resultant unitary operator. However, symbolically represented quantum circuits are useful in quantum circuit design for many reasons. In many cases, it is difficult to design and implement arbitrary physical quantum gates, but far easier to design and implement certain standard quantum gates, several of which are shown below. Error detection and correction is often needed for fault-tolerant quantum computing, but, in many cases, error-detection-and-correction methods have been worked out and are available for only certain well-known standard quantum gates. Designing and implementing quantum circuits as sequences of the well-known standard quantum gates provides a design and implementation to which error detection and error correction can be applied.

The matrix representations of a number of quantum gates, including the gates corresponding to single-qubit operators H, T, S, X, Y, and Z, are provided below:

$$H = \frac{1}{\sqrt{2}}\begin{bmatrix} 1 & 1 \\ 1 & -1 \end{bmatrix},$$

$$T = \begin{bmatrix} 1 & 0 \\ 0 & e^{i\frac{\pi}{4}} \end{bmatrix},$$

$$S = \begin{bmatrix} 1 & 0 \\ 0 & i \end{bmatrix} = TT,$$

$$X = \begin{bmatrix} 0 & 1 \\ 1 & 0 \end{bmatrix},$$

$$Y = \begin{bmatrix} 0 & -i \\ i & 0 \end{bmatrix},$$

$$Z = \begin{bmatrix} 1 & 0 \\ 0 & -1 \end{bmatrix}.$$

Multiplying quantum gate H by itself generates the identity matrix I or, equivalently, the Id operation:

$$HH = \frac{1}{2}\begin{bmatrix} 1 & 1 \\ 1 & -1 \end{bmatrix}\begin{bmatrix} 1 & 1 \\ 1 & -1 \end{bmatrix} = \frac{1}{2}\begin{bmatrix} 2 & 0 \\ 0 & 2 \end{bmatrix} = \begin{bmatrix} 1 & 0 \\ 0 & 1 \end{bmatrix} = I.$$

The number of times that a quantum gate or operator is multiplied by itself to generate the identity operation Id is the algebraic order of the quantum gate. Thus, the algebraic order of quantum gate H is 2. The algebraic order of the quantum gate T is 8:

$$TTTTTTTT = \begin{bmatrix} 1 & 0 \\ 0 & 1 \end{bmatrix}.$$

All of the possible 2×2 unitary matrices corresponding to rotations of state vectors in dual inner-product spaces defined by two orthonormal basis vectors form an infinite group referred to as U(2). The group is infinite because the 2×2 unitary matrices are defined in terms of two complex numbers, of which there are an infinite number of pairs that meet the above-discussed constraints for rotation matrices. There are an infinite number of global phase-rotation matrices, or operators, that are members of U(2). These global phase-rotation matrices, or operators, form an infinite subgroup of U(2) that is referred to as GPh:

$$GPh = \left[\begin{bmatrix} e^{i\alpha} & 0 \\ 0 & e^{i\alpha} \end{bmatrix}, \begin{bmatrix} e^{i\beta} & 0 \\ 0 & e^{i\beta} \end{bmatrix}, \begin{bmatrix} e^{i\gamma} & 0 \\ 0 & e^{i\gamma} \end{bmatrix}, \ldots\right] \text{ where } \alpha, \beta, \gamma, \ldots \in R.$$

The infinite group U(2) can be factored by the subgroup GPh to generate the infinite group PSU(2), where PSU(2) is U(2) modulo GPh:

$$U(2) = [\ldots \ e^{i\phi_a} U_j \ \ldots \ e^{i\phi_b} U_j \ \ldots \ e^{i\phi_c} U_j \ \ldots \ e^{i\phi_a} U_k \ \ldots$$
$$e^{i\phi_b} U_k \ \ldots \ e^{i\phi_c} U_k \ \ldots \ e^{i\phi_a} U_l \ \ldots \ e^{i\phi_b} U_l \ \ldots],$$

$$\frac{U(2)}{GPh} = [\ldots \ U_j \ \ldots \ U_k \ \ldots \ U_l \ \ldots] = PSU(2),$$

where a, b, c, j, k, and l are integer indexes. The trace of a matrix is the sum of the diagonal elements of the matrix. The traces of all members of U(2) that map to a particular member of PSU(2) by the modulo operation with respect to GPh are identical:

$$tr\left(\begin{bmatrix} e^{i\phi} & 0 \\ 0 & e^{i\phi} \end{bmatrix}\begin{bmatrix} a & b \\ -b^* & a^* \end{bmatrix}\right) =$$

$$e^{i\phi} tr\left(\begin{bmatrix} a & b \\ -b^* & a^* \end{bmatrix}\right) = tr\left(\begin{bmatrix} a & b \\ -b^* & a^* \end{bmatrix}\right) \text{ since } |e^{i\phi}| = 1.$$

Figure 4A:
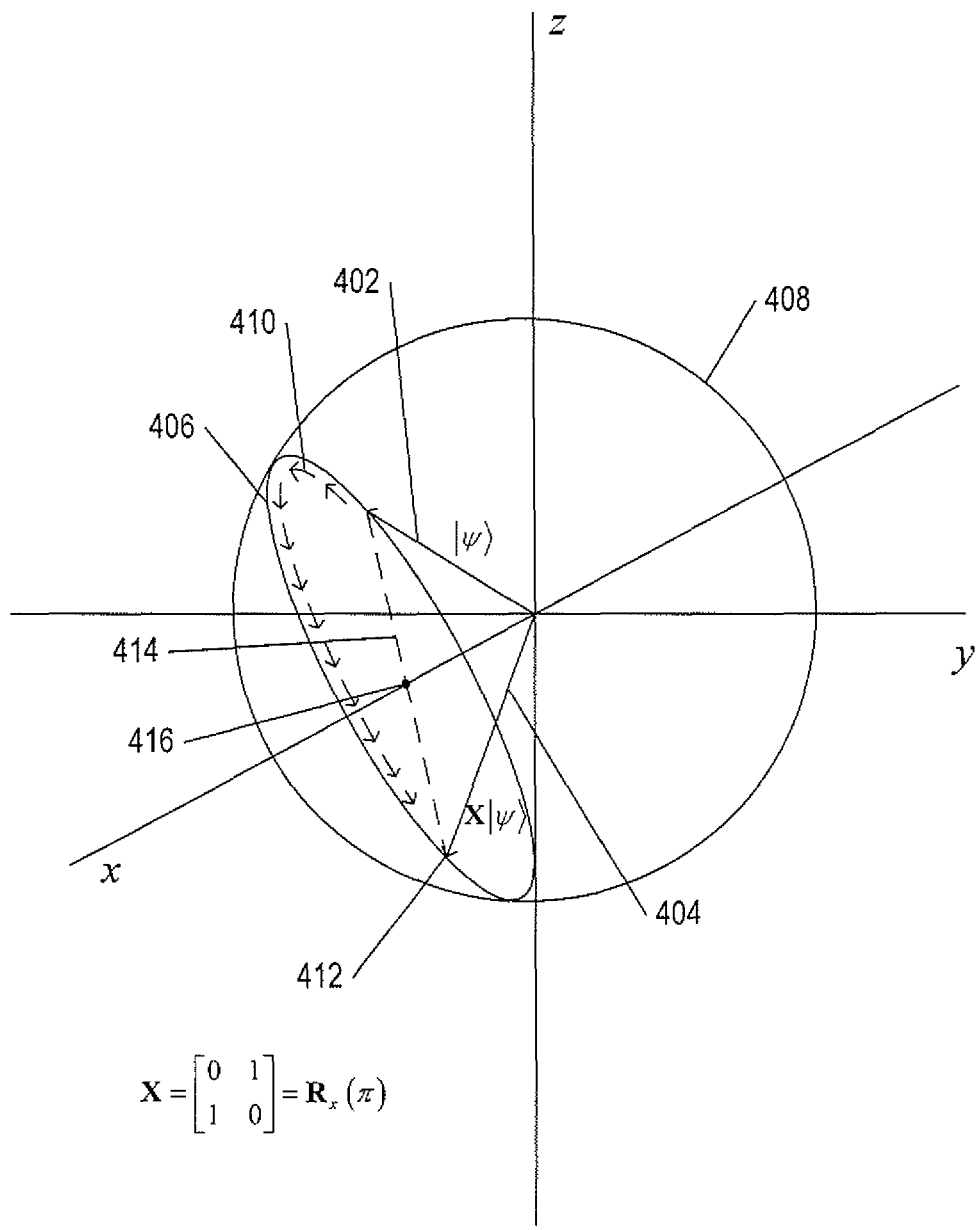
FIGS. 4A-F illustrate the rotations of qubit state vectors, illustrated using the Bloch-sphere convention, produced by various operators expressed as 2×2 matrices.
Figure 4B:
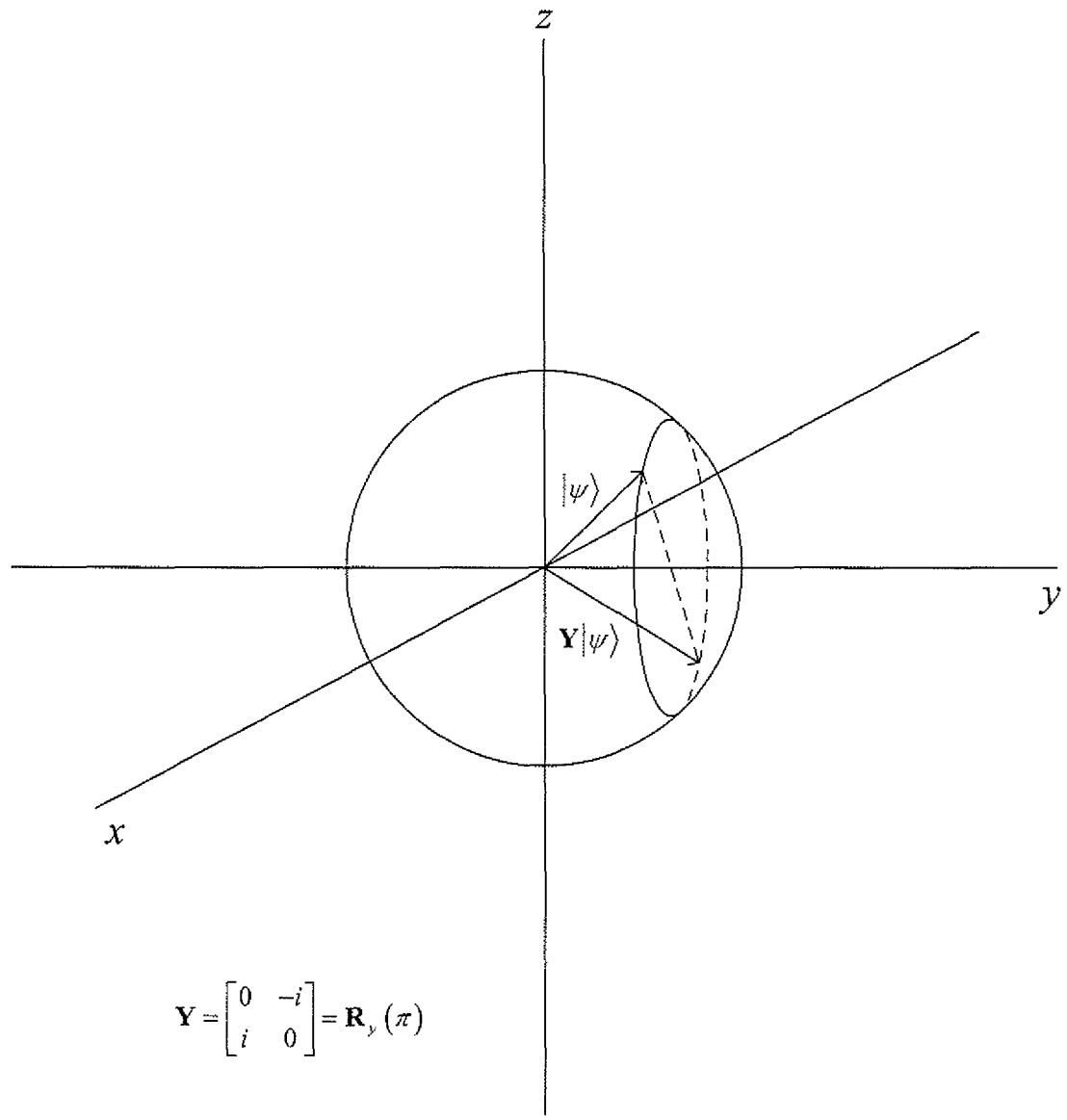
Figure 4C:
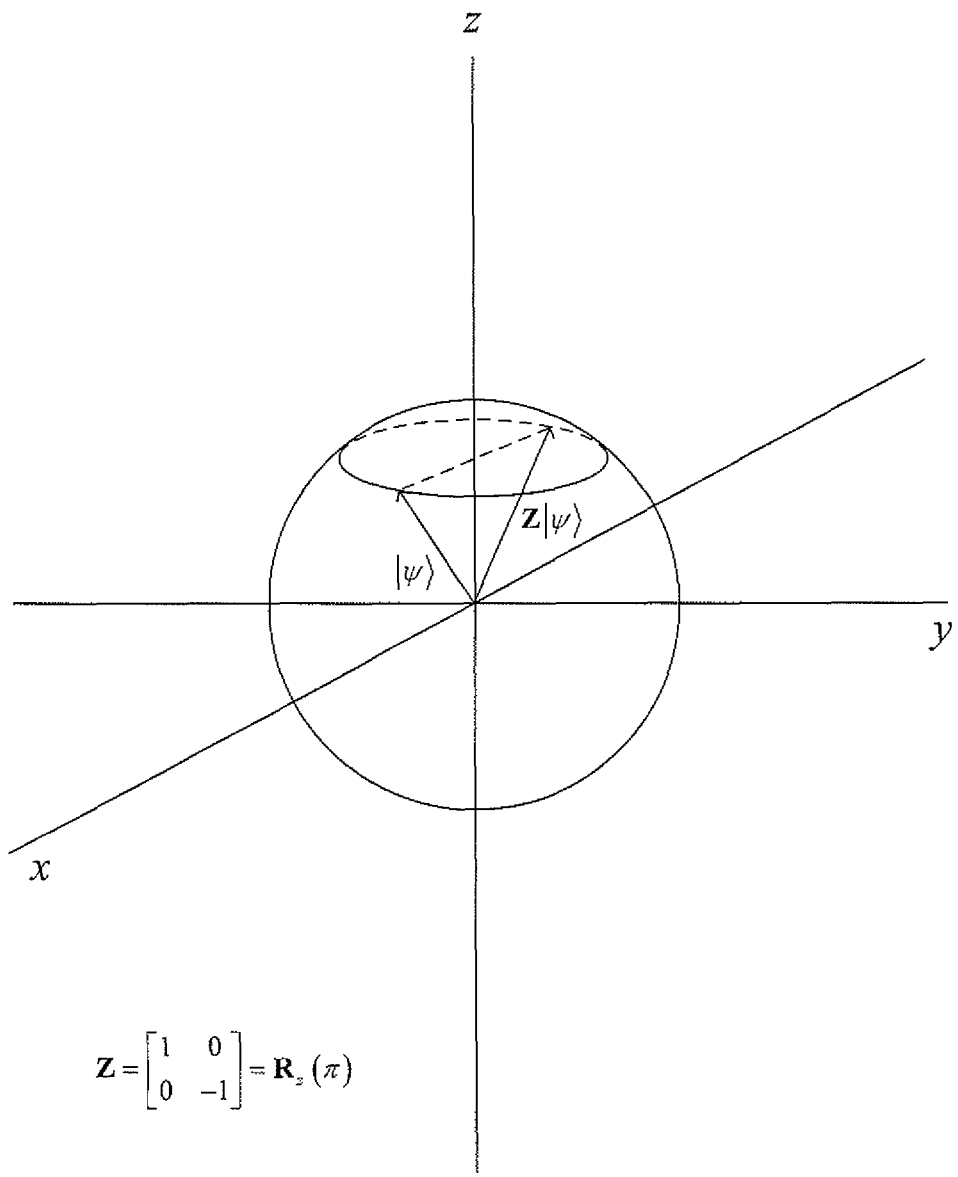

FIGS. 4A-F illustrate the rotations of qubit state vectors, illustrated using the Bloch-sphere convention, produced by various operators expressed as 2×2 matrices. FIGS. 4A-C illustrate the Pauli operations X, Y, and Z. In FIG. 4A, an initial qubit state vector |ψ⟩ 402 is operated on by the Pauli operator X to produce the rotated state vector X|ψ⟩ 404. This rotation is a rotation about the Bloch-sphere x axis. In FIG. 4A, the circle 406 inscribed within the Bloch sphere 408 describes all possible rotations about the x axis of the original state vector |ψ⟩ 402. The particular rotation corresponding to the X operator is a rotation of a radians about the x axis. Thus, the head of the original state vector |ψ⟩ 402 can be viewed, as indicated by small arrows, such as small arrow 410, as following the circle to the point 412 corresponding to the rotated state vector X|ψ⟩. A line in the plane of the circle connecting the original position of the original state vector |ψ⟩ with the position of the rotated stated vector X|ψ⟩ 414 passes through the x axis at point 416. Note that both |ψ⟩ and X|ψ⟩ are unit vectors with heads coincident with the surface of the Bloch sphere. Using the same illustration conventions used in FIG. 4A, FIGS. 4B and 4C illustrate the Pauli Y and Z operators operating on an initial state vector |ψ⟩ to generate a rotated state vector Y|ψ⟩ and Z|ψ⟩, respectively, which are π-radian rotations about the y and z axes. As shown in FIGS. 4A-C, the X, Y, and Z operators may be expressed as operators, 2×2 matrices, or by the rotation notations $R_x(\pi)$, $R_y(\pi)$, and $R_z(\pi)$. The rotations $R_x(\theta)$, $R_y(\theta)$, and $R_z(\theta)$ may be equivalently designated as X(θ), Y(θ), Z(θ), respectively.

Figure 4D:
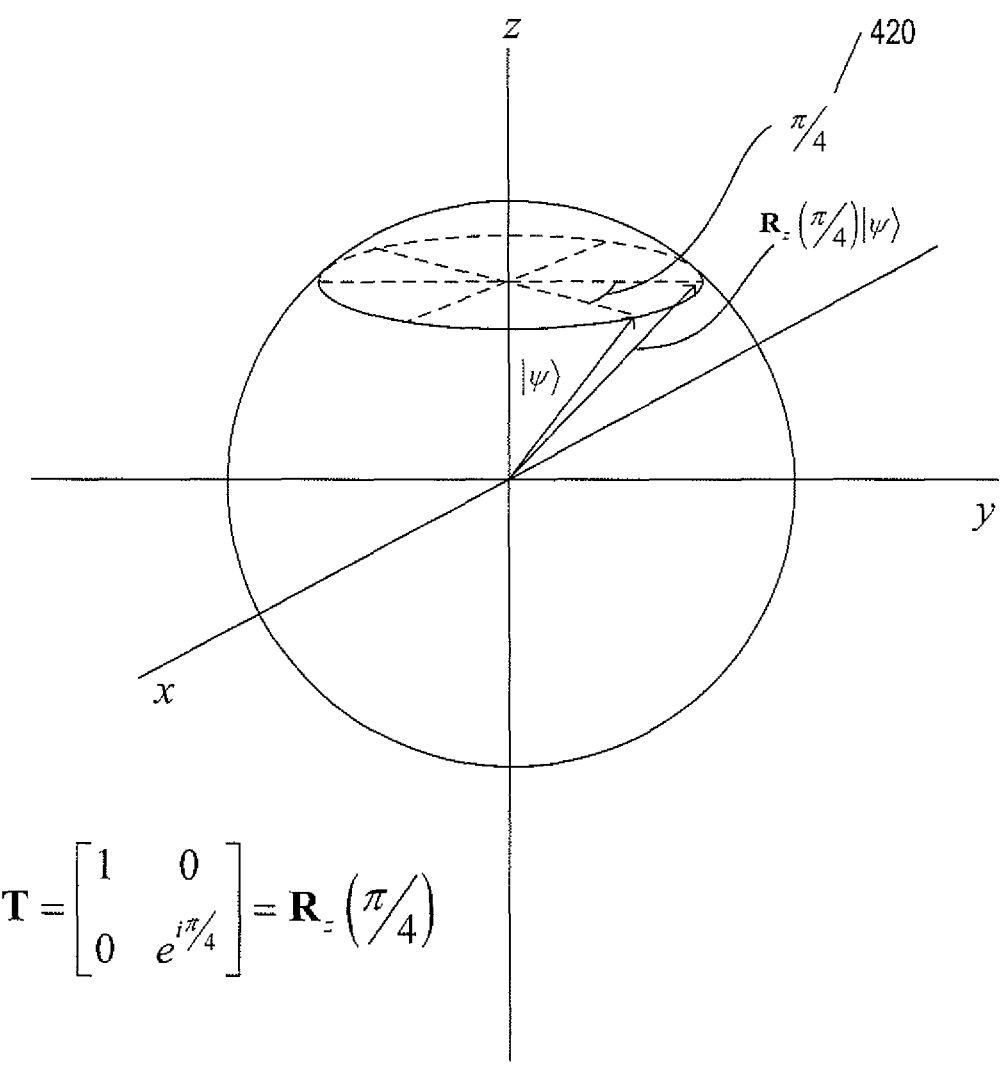
Figure 4E:
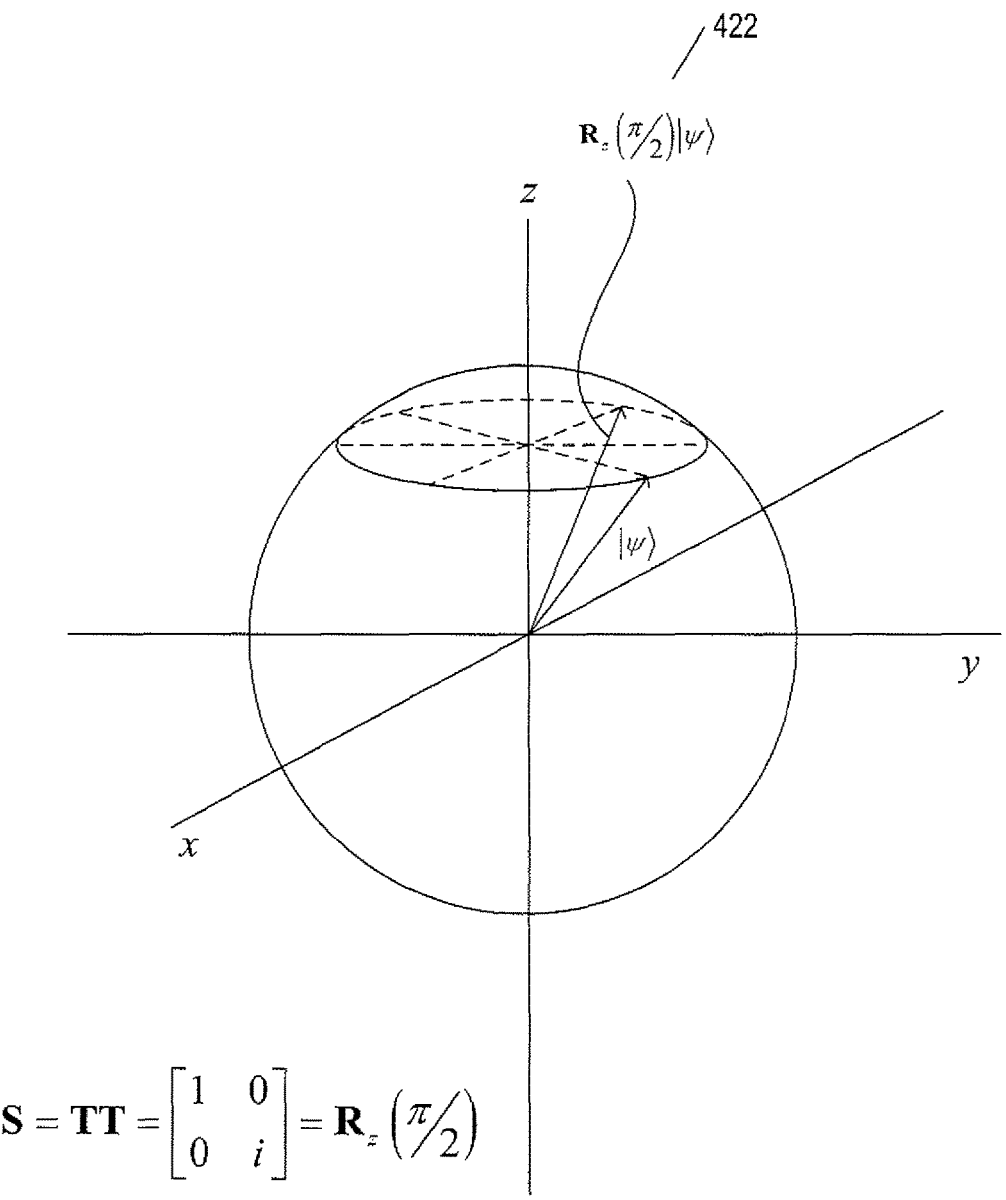

FIG. 4D illustrates the rotation produced by the T operator. The T operator, or T gate, produces a rotation of $$\frac{\pi}{4}$$

radians about the z axis 420. FIG. 4E shows the rotation produced by the S operator or S gate, which is a rotation of $$\frac{\pi}{2}$$

radians about the z axis. Because S=TT, the z rotation produced by the S gate is $$R_z\left(\frac{\pi}{2}\right) = R_z\left(\frac{\pi}{4}\right) R_z\left(\frac{\pi}{4}\right)$$

Figure 4F:
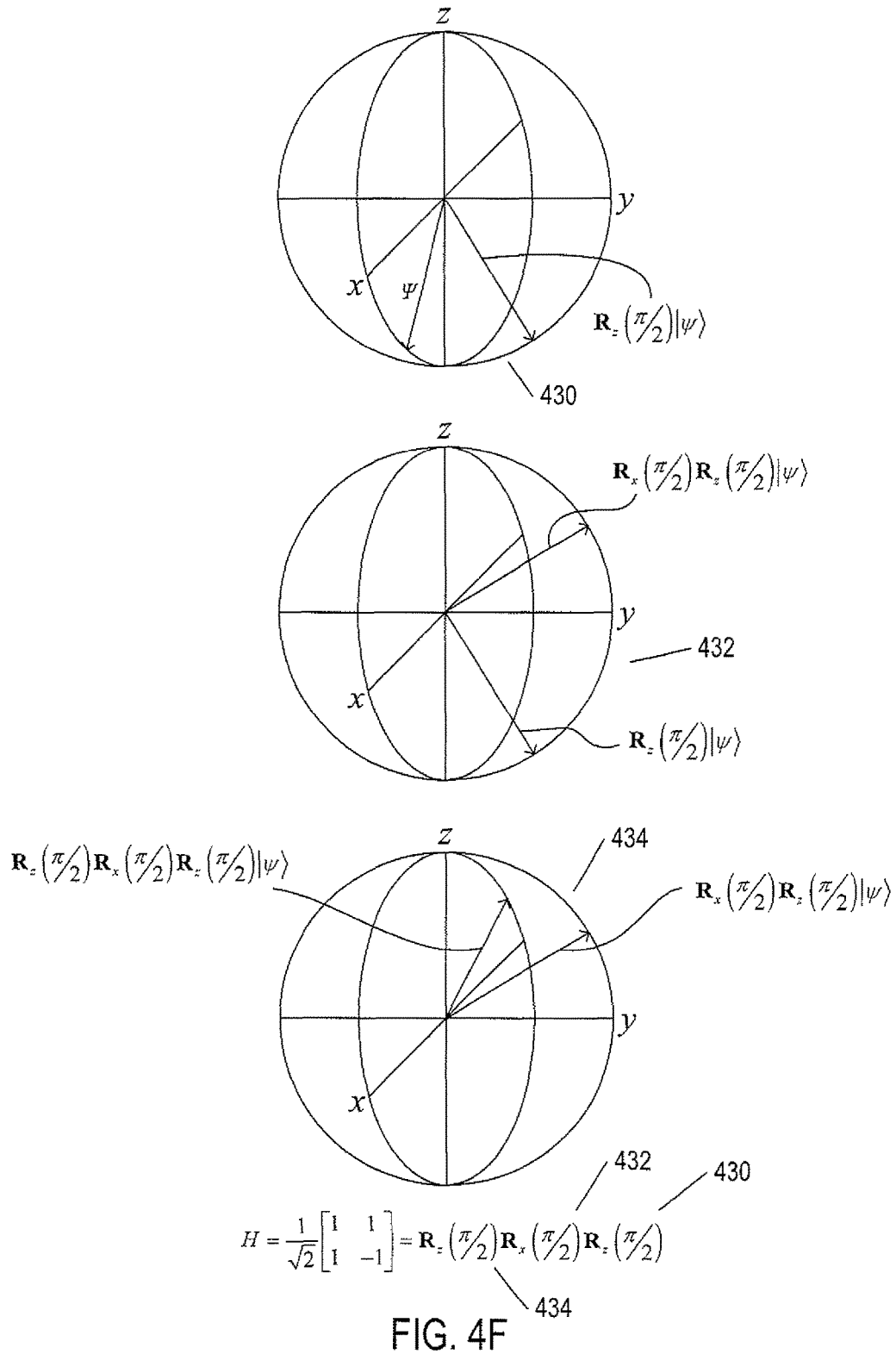

(422 in FIG. 4E). Finally, FIG. 4F shows the rotation produced by the Hadamard operator H. As shown in FIG. 4F, the H operator can be obtained from a first rotation of $$\frac{\pi}{2}$$

radians about the z axis 430, a rotation of $$\frac{\pi}{2}$$

radians about the x axis 432, and then another rotation of $$\frac{\pi}{2}$$

radians about the z axis 434. Note that the rotation operators, like the equivalent 2×2 matrix operators, are applied right to left.

It is well known that the group of symbolic representations of quantum circuits generated by the quantum-gate basis <H,T>, where H and T are two of the quantum-gate operators discussed above, is everywhere dense in PSU(2). The infinite group of symbolic representations of quantum circuits generated by the basis <H,T> is:

$$\langle H, T \rangle \rightarrow \begin{bmatrix} T, TT, TH, TTT, TTH, THT, THH, \ldots, \\ H, HT, HH, HTT, HTH, HHT, HHH, \ldots \end{bmatrix} = U_{\langle H,T \rangle}.$$

Figure 5:
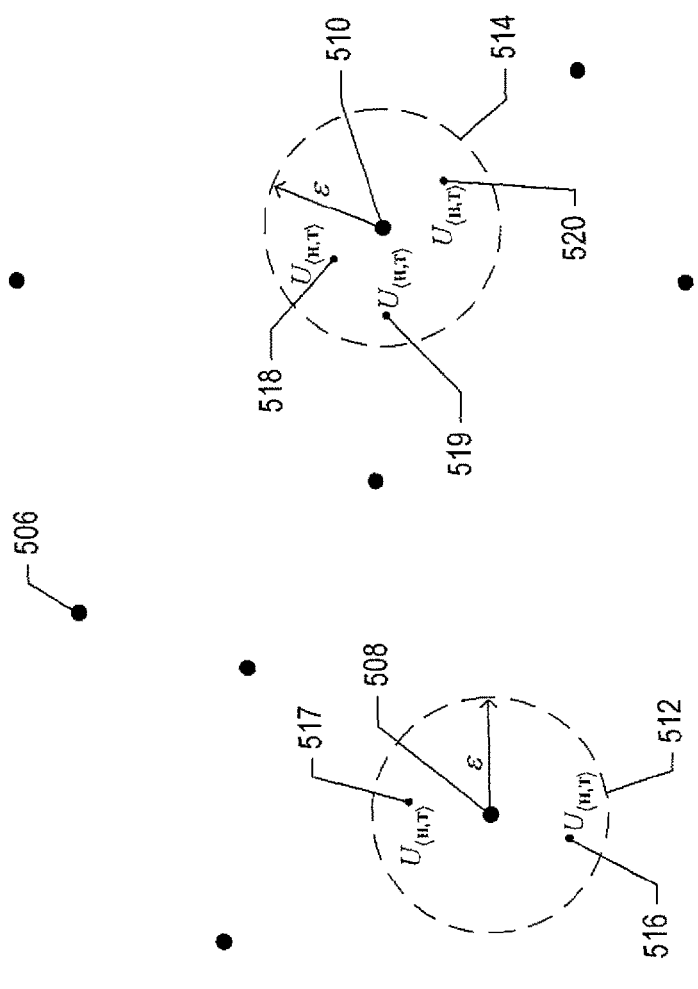
FIG. 5 illustrates what it means for $U_{<H,T>}$ to be everywhere dense in PSU(2).

FIG. 5 illustrates what it means for $U_{\langle H,T \rangle}$ to be everywhere dense in PSU(2). In FIG. 5, a number of points representing elements of PSU(2), such as point 506, are shown distributed within an operator space. The group $U_{\langle H,T \rangle}$ is a subset of PSU(2). Considering any arbitrary member or members of PSU(2), such as the two members of PSU(2) represented by points 508 and 510, and constructing a ball of radius ϵ>0 about the selected members of PSU(2), as represented in plane projection by dashed circles 512 and 514, it is guaranteed that members of $U_{\langle H,T \rangle}$ can be found within each ball, such as $U_{\langle H,T \rangle}$ members 516-520, regardless of the magnitude of s. In some cases, the selected member of PSU(2) may also be a member of $U_{\langle H,T \rangle}$, but, in all cases, a member of $U_{\langle H,T \rangle}$ can be found nearby. Thus, for any unitary circuit u in PSU(2) and for any distance-metric value ϵ>0, there exists a circuit u' in $U_{\langle H,T \rangle}$ such that the distance between u' and u is less than ϵ. In other words, any quantum circuit in PSU(2) can be approximated as closely as desired by a corresponding quantum circuit generated only from H and T quantum gates. The quantum circuits in $U_{<H,T>}$ can be expressed and represented as sequences of H and T symbols. Various different distance metrics for the distance between quantum circuits U' and U can be used, such as the metric:

$$\text{dist}(U',U) = \sqrt{(2-|tr(U'\cdot U)|)/2},$$

where U' is the adjoint, or complex-conjugate transpose, of U.

It is generally a difficult problem to implement an arbitrary quantum circuit U selected from PSU(2). However, the fact that an arbitrary quantum gate U can be approximated, to any desired level of approximation, by a quantum circuit U' selected from $U_{<H,T>}$ provides a direction for automating the determination of practically implementable and efficient quantum circuits.

As discussed above, the state of a qubit can be expressed as a state vector within the Bloch sphere. Another representation of the state of the qubit is referred to as the density matrix for the qubit. The density matrix ρ for a qubit in state $|\psi\rangle = a|0\rangle + b|1\rangle$ can be constructed by:

$$\rho = |\psi\rangle\langle\psi|,$$
$$= \begin{bmatrix} a \\ b \end{bmatrix}[a^*, b^*],$$
$$= \begin{bmatrix} aa^* & ab^* \\ ba^* & bb^* \end{bmatrix},$$
$$= \begin{bmatrix} |a|^2 & ab^* \\ ba^* & |b|^2 \end{bmatrix}.$$

In the density matrix for a state vector, the probabilities associated with each basis vector appear along the diagonal.

An operator, such as the operator H, when applied to a qubit state, may generate the same state multiplied by a complex number. For example:

$$H|H\rangle = a|H\rangle,$$

where $|H\rangle$ is a state; and
a is a complex number.
In this case, $|H\rangle$ is referred to as an eigenstate of the operator H and the complex number a is referred to as the corresponding eigenvalue of the operator H. The eigenstate of the operator H with eigenvalue a=1 is:

$$|H\rangle = \cos\frac{\pi}{8}|0\rangle + \sin\frac{\pi}{8}|1\rangle.$$

In certain cases, in implementing quantum circuits, it is desirable to prepare a qubit with a state vector equal to $|H\rangle$. In other words, an implementation may require a qubit in state $|H\rangle$ as input to a quantum circuit, where the qubit in state $|H\rangle$ is referred to as a "resource state." In the general case, a qubit can be prepared with a state vector only approximately equal to a desired eigenstate. The fidelity of a prepared state with respect to the eigenstate $|H\rangle$, $F_H$, is obtained from the density matrix ρ representation of the qubit by:

$$F_H(\rho) = \sqrt{\langle H|\rho|H\rangle}.$$

The fidelity with respect to eigenstate $|H\rangle$ is 1 for a qubit in state $|H\rangle$:

$$F_H(\rho_{|H\rangle}) = 1.$$

For a qubit that is not in eigenstate $|H\rangle$, but is instead in a state $|\tilde{H}\rangle$ that is displaced by a displacement angle from $|H\rangle$ that represents noise, the fidelity is within the range [0,1) or:

$$0 \leq F_H(\rho_{|\tilde{H}\rangle}) < 1.$$

The error probability or discrepancy between a qubit in state $|\tilde{H}\rangle$ with respect to eigenstate $|H\rangle$ is then:

$$1 - F_H(\rho_{|\tilde{H}\rangle}).$$

Alternatively, the error probability or discrepancy between a qubit in state $|\tilde{H}\rangle$ with respect to eigenstate $|H\rangle$ can be considered to be the angular displacement between the two state vectors used to represent states $|\tilde{H}\rangle$ and $|H\rangle$.

The Pauli group $P_1$ on one qubit is defined to include elements represented by the 2×2 Pauli and identity matrices together with the multiplicative factors ±1 and ±i:

$$P_1 = \{\pm X, \pm iX, \pm Y, \pm iY, \pm Z, \pm iZ, \pm I, \pm iI\}.$$

The Pauli group $P^{\otimes n}$ on n qubits is defined to be all n-fold tensor products of the elements of $P_1$. The n-qubit Clifford group consists of the unitary operators that normalize the Pauli group $P^{\otimes n}$:

$$\text{Clifford group} = \{U \in U(2^n) | \sigma \in P^{\otimes n} \Rightarrow U\sigma U^+ \in P^{\otimes n}\}/U(1),$$

where group U(1) includes complex-number elements and is included in U(2). The phrase "Clifford operation" refers to any quantum operation that can be implemented using Clifford unitaries, where Clifford unitaries are elements of the Clifford group, together with preparation and measurement in the standard basis. States that can be prepared with Clifford operations are known as "stabilizer states."

The eigenstate $|H\rangle$ is not a stabilizer state, because it is stabilized by the Hadamard gate rather than by a tensor product of Pauli gates. Clifford operations together with preparation and measurement in the standard basis cannot therefore be used to prepare a qubit in state $|H\rangle$. However, there is a well-known process, known as magic-state distillation, that can be implemented with Clifford gates to produce qubits with high fidelities with respect to the non-stabilizer state $|H\rangle$. States such as $|H\rangle$, which can be distilled by this process, are referred to as "magic states."

Figure 6:
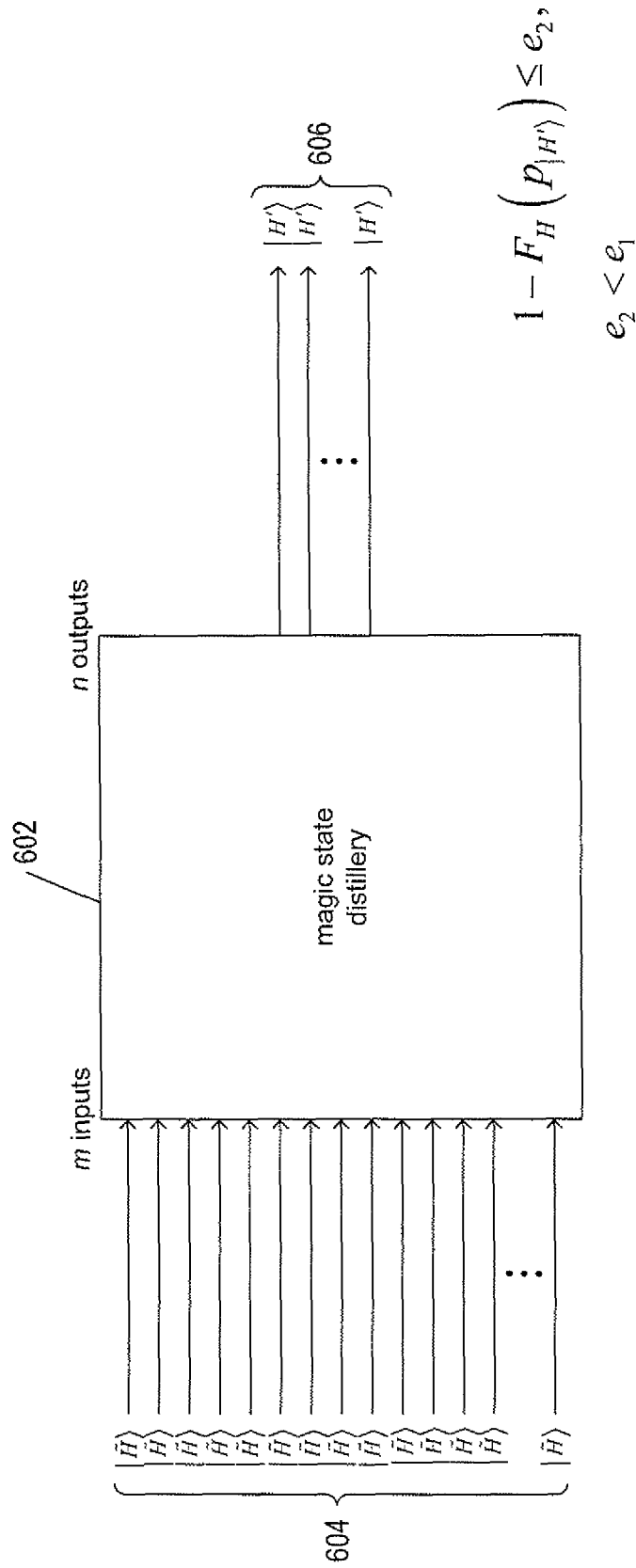
FIG. 6 illustrates the magic-state distillation process.

FIG. 6 illustrates the magic-state distillation process. In FIG. 6, an implementation of the magic-state distillation process 602, referred to as a "magic-state distillery," receives, as input, a number m of input qubits 604 in noisy states $|\tilde{H}\rangle$. These noisy states $|\tilde{H}\rangle$ may differ from one another, but are characterized as having error probabilities or angular displacements with respect to the magic state $|H\rangle$ less than $e_1$:

$$1 - F_H(\rho_{|\tilde{H}\rangle}) \leq e_1.$$

The magic-state distillery outputs a number n of qubits 606 in states $|H'\rangle$, where:

$$1 - F_H() \leq e_2,$$

$$e_2 < e_1.$$

Figure 7B:
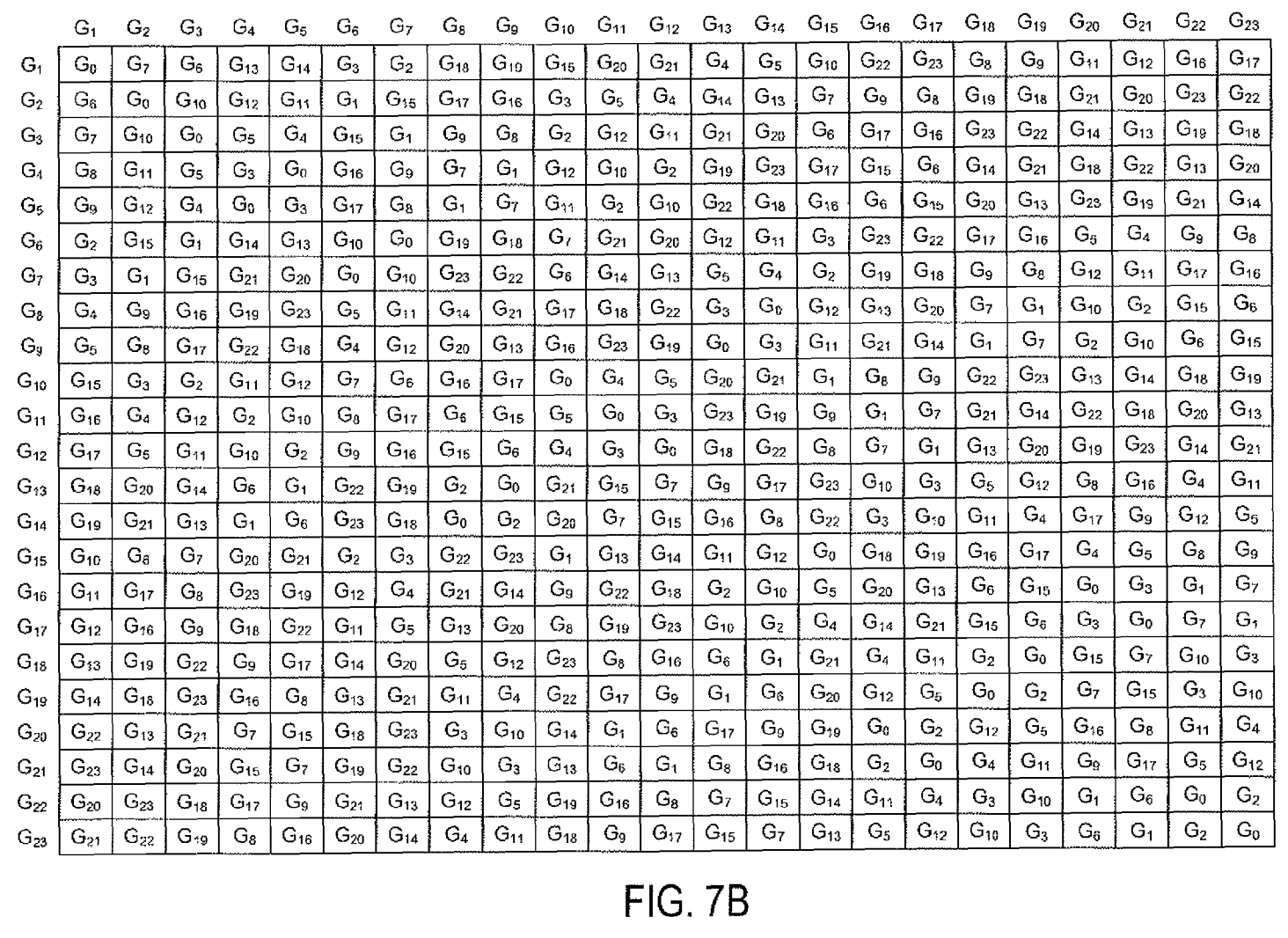

FIGS. 7A-B illustrate the single-qubit Clifford group. FIG. 7A shows, in tabular form, the elements of the single-qubit Clifford group using the notation $G_x$, where x is an integer in {0, 1, . . . , 23}, paired with symbolic representations in the <H,S> basis. FIG. 7B provides a group-multiplication table for the single-qubit Clifford group. Group multiplication of any two elements $G_x$ and $G_y$ of the single-qubit Clifford group generates an element of the single-qubit Clifford group according to the multiplication rules shown in FIG. 7B.

A Quantum Circuit that Produces Non-Stabilizer Qubit States

The current subsection is directed to the production of non-stabilizer qubit states by a ladder-like quantum-circuit subsystem and represents one family of quantum circuits to which the current application is directed. As discussed above, determining a fault-tolerant implementation for an arbitrary quantum gate U in U(2) is, in general, a computationally difficult task. Various approximation methods are currently employed. The current application discloses a new approach that provides significant advantages, as an example of an application of non-stabilizer qubit states prepared by the quantum-circuit subsystem, discussed in the current subsection.

Figure 8:
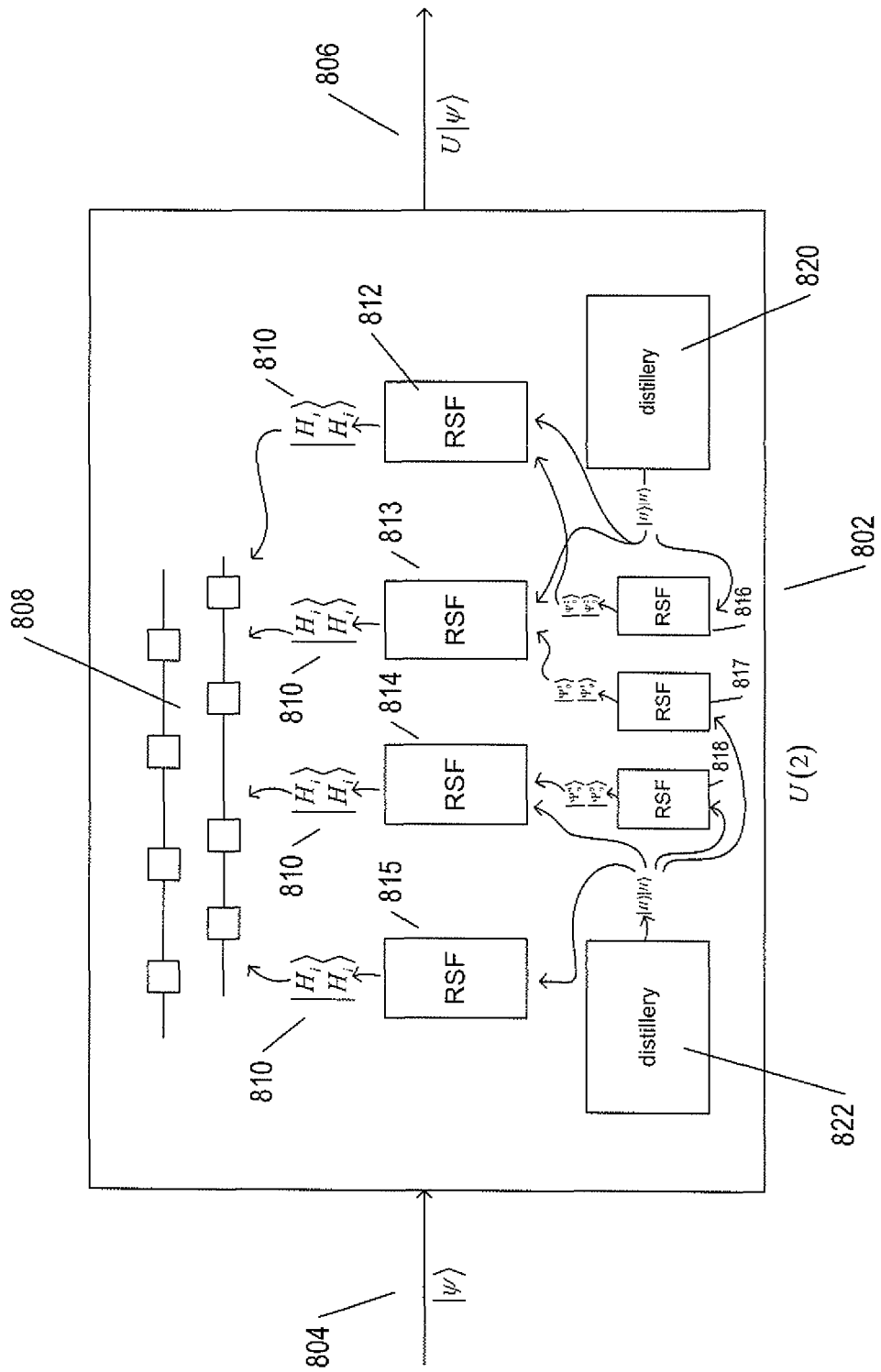
FIG. 8 illustrates one implementation of an arbitrary single-qubit unitary quantum gate.

FIG. 8 illustrates one implementation of an arbitrary single-qubit unitary quantum gate. The unitary quantum gate 802 receives, as input, a qubit in state $|\psi\rangle$ 804 and produces, as output, a qubit in state $U|\psi\rangle$ 806, where U is any desired unitary operator. The unitary quantum gate, in one implementation, includes quantum circuitry 808 that involves a finite number of Clifford gates that consume qubits in prepared states, alternatively referred to as "resource states." The consumption of resource states by the quantum circuitry 808 is referred to as "online" processing, and the number of resource states consumed is referred to as the "online cost" of the unitary quantum gate. The resource states are prepared by resource-state factories ("RSFs") 812-818 that consume magic-state qubits produced by magic-state distilleries 820 and 822, referred to as "offline" processing, with the number of magic-state qubits consumed referred to as the "offline cost." In certain implementations, the resource states are qubits with states $|H_1\rangle$, produced by ladder-like-quantum-circuit-subsystem RSFs 812-815, and the magic-state qubits produced by the magic-state distilleries each have states close to state $|H\rangle$. Various alternative implementations may adjust the relative proportion of online cost to offline cost by moving a portion of the online processing to offline processing. Implementation details are provided below.

Figure 9A:
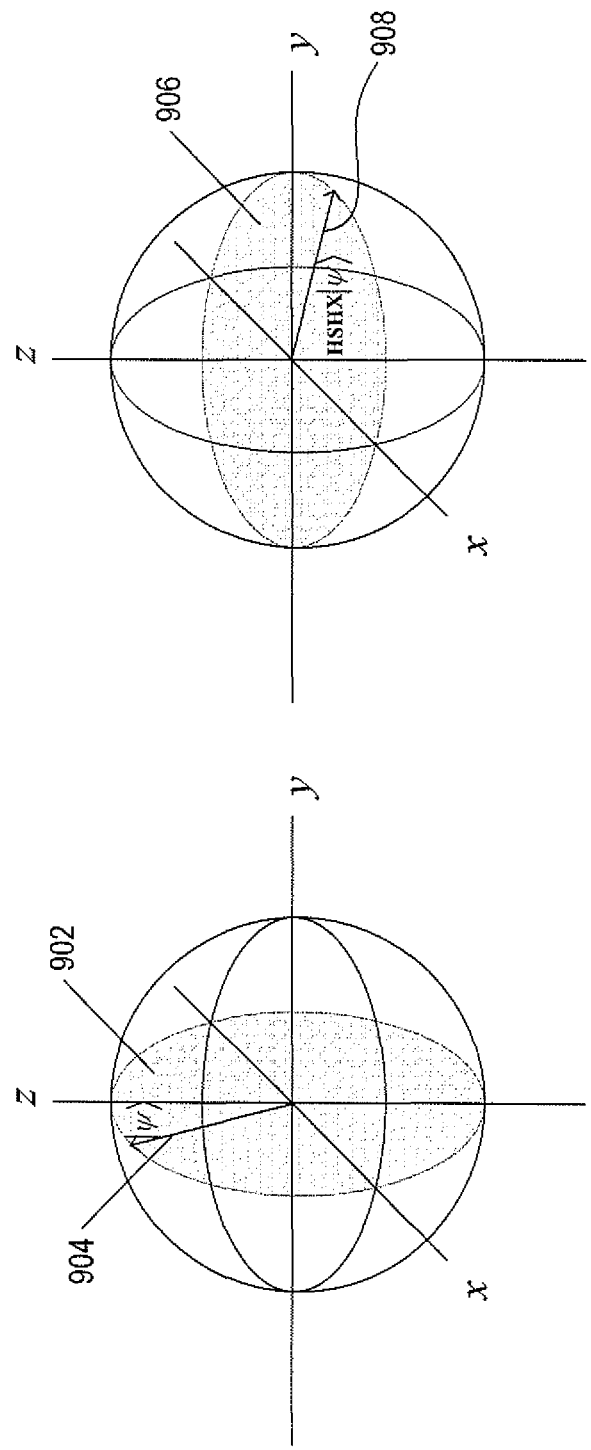

FIGS. 9A-B each illustrate two portions of two planes inscribed within the Bloch sphere and an operation that rotates a vector $|\psi\rangle$ from the xz Bloch-sphere plane to the xy Bloch-sphere plane. The shaded plane portion 902 represents the xz Bloch-sphere plane. A state vector $|\psi\rangle$ 904 is shown lying within this plane. Shaded plane portion 906 represents the xy plane within the Bloch sphere. The vector $|\psi\rangle$ in the xz plane 904 with Bloch-sphere angles θ and φ=0 can be rotated to lie within the xy plane with Bloch-sphere angles $$\theta' = \frac{\pi}{2}$$

and $$\phi' = \frac{\pi}{2} - \theta \quad 908$$

by the combination of operators HSHX. Thus, given a quantum-circuit subsystem that generates qubits with state vectors lying in the xz plane, a straightforward combination of Clifford gates can be used to rotate the xz-plane vectors into corresponding vectors within the xy plane. The rotation is, of course, reversible. Furthermore, a combination of three rotations about any two non-colinear Bloch-sphere vectors, such as vectors coincident with two different spatial axes, can be used to rotate a given state vector into any arbitrary target state vector.

The unitary operation corresponding to the combination of unitary quantum gates HSHX is, up to a global phase factor:

$$HSHX = \frac{1}{\sqrt{2}}\begin{bmatrix} 1 & 1 \\ 1 & -1 \end{bmatrix}\begin{bmatrix} 1 & 0 \\ 0 & i \end{bmatrix}\frac{1}{\sqrt{2}}\begin{bmatrix} 1 & 1 \\ 1 & -1 \end{bmatrix}\begin{bmatrix} 0 & 1 \\ 1 & 0 \end{bmatrix},$$

$$= \frac{1}{\sqrt{2}} e^{-i\frac{\pi}{4}} \begin{bmatrix} 1 & i \\ i & 1 \end{bmatrix},$$

$$\cong \frac{1}{\sqrt{2}}\begin{bmatrix} 1 & i \\ i & 1 \end{bmatrix}.$$

Given a qubit with a state or rotation lying in the xz plane with a Bloch-sphere angle θ:

$$|\psi\rangle = \begin{bmatrix} \cos\frac{\theta}{2} \\ \sin\frac{\theta}{2} \end{bmatrix},$$

the HSHX operator can be applied to the qubit in state $|\Psi\rangle$ to rotate the qubit into the xy plane, where equivalence is up to a global phase factor:

$$HSHX|\psi\rangle = \frac{1}{\sqrt{2}}\begin{bmatrix} 1 & i \\ i & 1 \end{bmatrix}\begin{bmatrix} \cos\frac{\theta}{2} \\ \sin\frac{\theta}{2} \end{bmatrix},$$

$$= \frac{1}{\sqrt{2}}\begin{bmatrix} 1 \\ e^{i(\frac{\pi}{2}-\theta)} \end{bmatrix}.$$

Application of the HSHX operator to the magic state vector $|H\rangle$, $HSHX|H\rangle$, can be expressed as:

$$HSHX|H\rangle = \frac{1}{\sqrt{2}}\left(|0\rangle + e^{i\frac{\pi}{4}}|1\rangle\right).$$

Thus, $HSHX|H\rangle$ lies within the xy Bloch-sphere plane, orthogonal to the z spatial axis.

FIG. 9B uses the same illustration conventions used in FIG. 9A to illustrate the operator $HS^\dagger$. The shaded plane portion 912 represents the xz Bloch-sphere plane. A state vector $|\psi\rangle$ 914 is shown lying within this plane. Shaded plane portion 916 represents the xy plane within the Bloch sphere. The vector $|\psi\rangle$ in the xz plane 914 with Bloch-sphere angles θ and φ=0 can be rotated to lie within the xy plane with Bloch-sphere angles $$\theta' = \frac{\pi}{2}$$

and $\phi'=\theta$ by the combination of operators $HS^\dagger$.

The unitary operation corresponding to the combination of unitary quantum gates $HS^\dagger$ is:

$$HS^\dagger = \frac{1}{\sqrt{2}}\begin{bmatrix} 1 & 1 \\ 1 & -1 \end{bmatrix}\begin{bmatrix} 1 & 0 \\ 0 & -i \end{bmatrix},$$

$$= \frac{1}{\sqrt{2}}\begin{bmatrix} 1 & -i \\ 1 & i \end{bmatrix}.$$

Given a qubit with a state or rotation lying in the xz plane with a Bloch-sphere angle $\theta$:

$$|\psi\rangle = \begin{bmatrix} \cos\frac{\theta}{2} \\ \sin\frac{\theta}{2} \end{bmatrix},$$

the $HS^\dagger$ operator can be applied to the qubit in state $|\psi\rangle$ to rotate the qubit into the xy plane, and is given, up to a global phase factor, by:

$$HS^\dagger|\psi\rangle = \frac{1}{\sqrt{2}}\begin{bmatrix} 1 & -i \\ 1 & i \end{bmatrix}\begin{bmatrix} \cos\frac{\theta}{2} \\ \sin\frac{\theta}{2} \end{bmatrix},$$

$$= \frac{1}{\sqrt{2}}\begin{bmatrix} 1 \\ e^{i\theta} \end{bmatrix}.$$

Application of the $HS^\dagger$ operator to the magic state vector $|H\rangle$, $HS^\dagger|H\rangle$, can be expressed as:

$$HS^\dagger|H\rangle = \frac{1}{\sqrt{2}}(|0\rangle + e^{i\frac{\pi}{4}}|1\rangle).$$

Thus, $HS^\dagger|H\rangle$ lies within the xy Bloch-sphere plane, orthogonal to the z spatial axis.

Figure 10A:
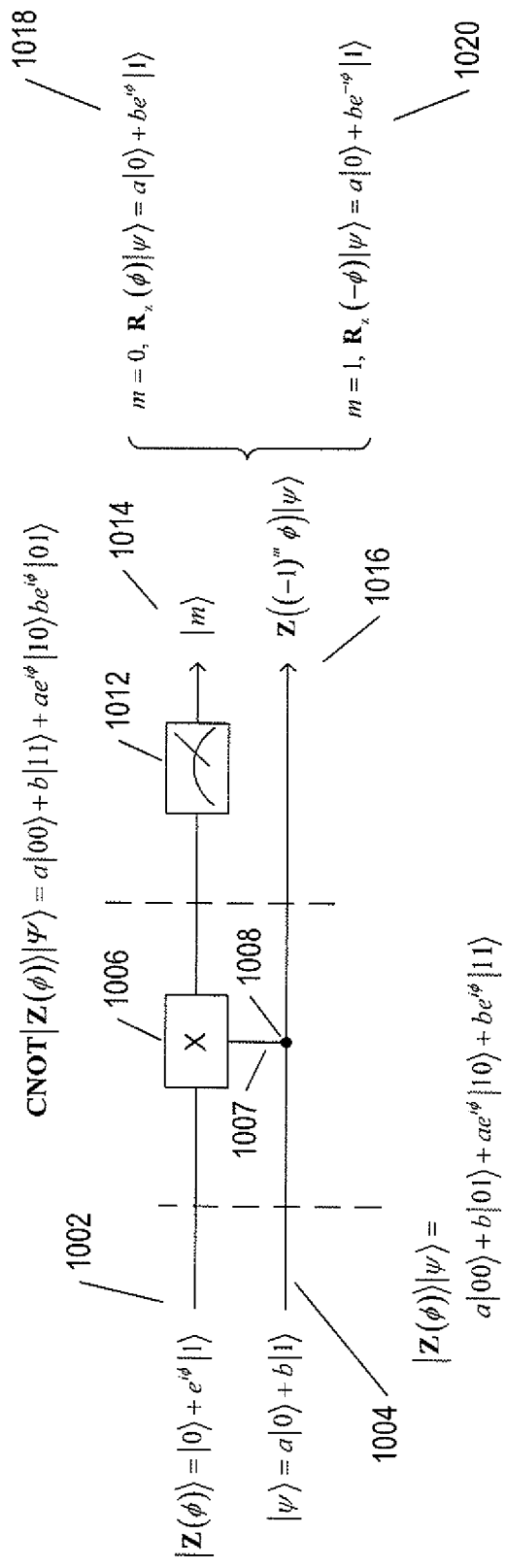
FIGS. 10A-B illustrate two rotation circuits.
Figure 10B:
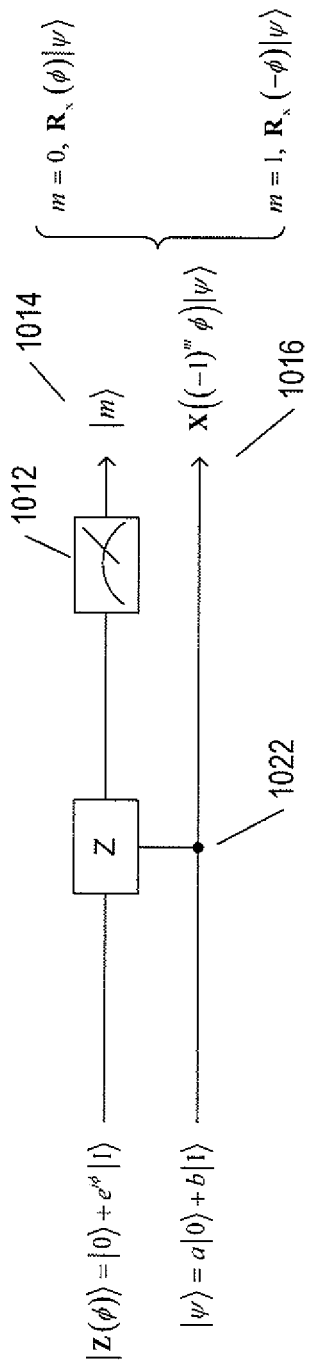

FIGS. 10A-B illustrate two rotation circuits. FIG. 10A illustrates a two-qubit quantum circuit that rotates the state vector of an input qubit about the z axis. The inputs to the quantum circuit include a first qubit, referred to as the "control qubit," with a state vector lying in the xy Bloch-sphere plane with an angle φ 1002. A second input qubit, referred to as the "subject qubit," has the arbitrary state $|\psi\rangle$ 1004. The two-qubit state of the two input qubits, indicated by a vertical dashed line and the following expression, can be expressed as the tensor product of the single-qubit states of the two input qubits:

$$|Z(\phi)\rangle|\psi\rangle = a|00\rangle + b|01\rangle + ae^{i\phi}|10\rangle + be^{i\phi}|11\rangle.$$

The symbols 1006-1008 together represent a two-qubit controlled-NOT gate, expressible in matrix form as:

$$\begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

When the state of the subject qubit is $|0\rangle$, the state of the control qubit is unaffected by the X-gate portion of the controlled-NOT gate, also referred to as a "CNOT gate." However, when the state of the subject qubit is $|1\rangle$, the state of the control qubit is inverted, either from $|0\rangle$ to $|1\rangle$ or from $|1\rangle$ to $|0\rangle$. After the two qubits pass through the controlled-NOT gate, the two-qubit state of the circuit is:

$$CNOT|Z(\phi)\rangle|\psi\rangle = a|00\rangle + b|11\rangle + ae^{i\phi}|10\rangle be^{i\phi}|01\rangle.$$

The state of the control qubit is measured by measurement operator 1012, producing either $|0\rangle$ or $|1\rangle$ 1014, where in is equal to 0 or 1. The subject qubit is output 1016. As shown in FIG. 10A, when the state of the control qubit is measured to be $|0\rangle$, the state of the subject qubit is rotated by the angle φ about the z axis with respect to the input state of the lower qubit 1018. When the state of the control qubit is measured to be $|1\rangle$, the output state of the subject qubit is rotated about the z axis by an angle −φ with respect to the input state of the lower qubit 1020. The z-rotation quantum circuit shown in FIG. 10 is thus probabilistic, producing one of two different rotations about the z spatial axis of angles φ and −φ.

The quantum circuit illustrated in FIG. 10A is easily modified to produce rotations about the x spatial axis. FIG. 10B illustrates a two-qubit quantum circuit that rotates the state vector of an input qubit about the x axis. Gate 1006-1008 in FIG. 10A is changed to a controlled-Z gate 1020, rather than the controlled-X (controlled-NOT) gate in FIG. 10A, to produce rotations about the x spatial axis.

Figure 11:
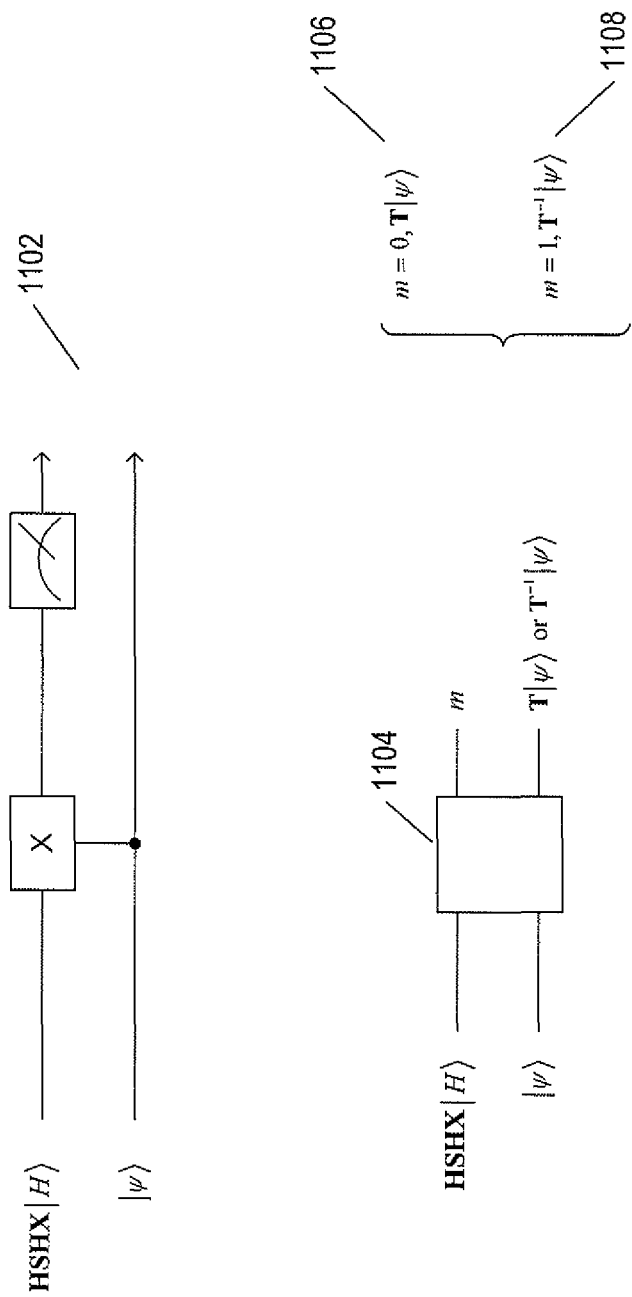
FIG. 11 illustrates implementation of the unitary quantum gate T using the z-rotation quantum circuit illustrated in FIG. 10.

FIG. 11 illustrates implementation of the unitary quantum gate T using the z-rotation quantum circuit illustrated in FIG. 10A. As shown in FIG. 11, the z-rotation quantum circuit with control qubit in the state HSHX$|\rangle$ or $HS^\dagger|H\rangle$ and subject qubit in the state $|\psi\rangle$ 1102 is equivalent to a quantum gate 1104 that carries out either the T or the inverse T operation. The inverse T operation, $T^{-1}$, is identical to the adjoint T operation, $T^\dagger$, where the matrix corresponding to $T^\dagger$ is the complex-conjugate transpose of the matrix corresponding to T. When measurement of the control qubit returns 0, the gate has carried out a T rotation 1106 and when measurement of the control qubit returns 1, the gate has carried out a $T^{-1}$ rotation 1108. Because S=TT, when m=1, the output of unitary quantum gate 1104 can be corrected to a T rotation by rotating the output qubit by application of the S operator to the $T^{-1}$ rotated output qubit.

Figure 12:
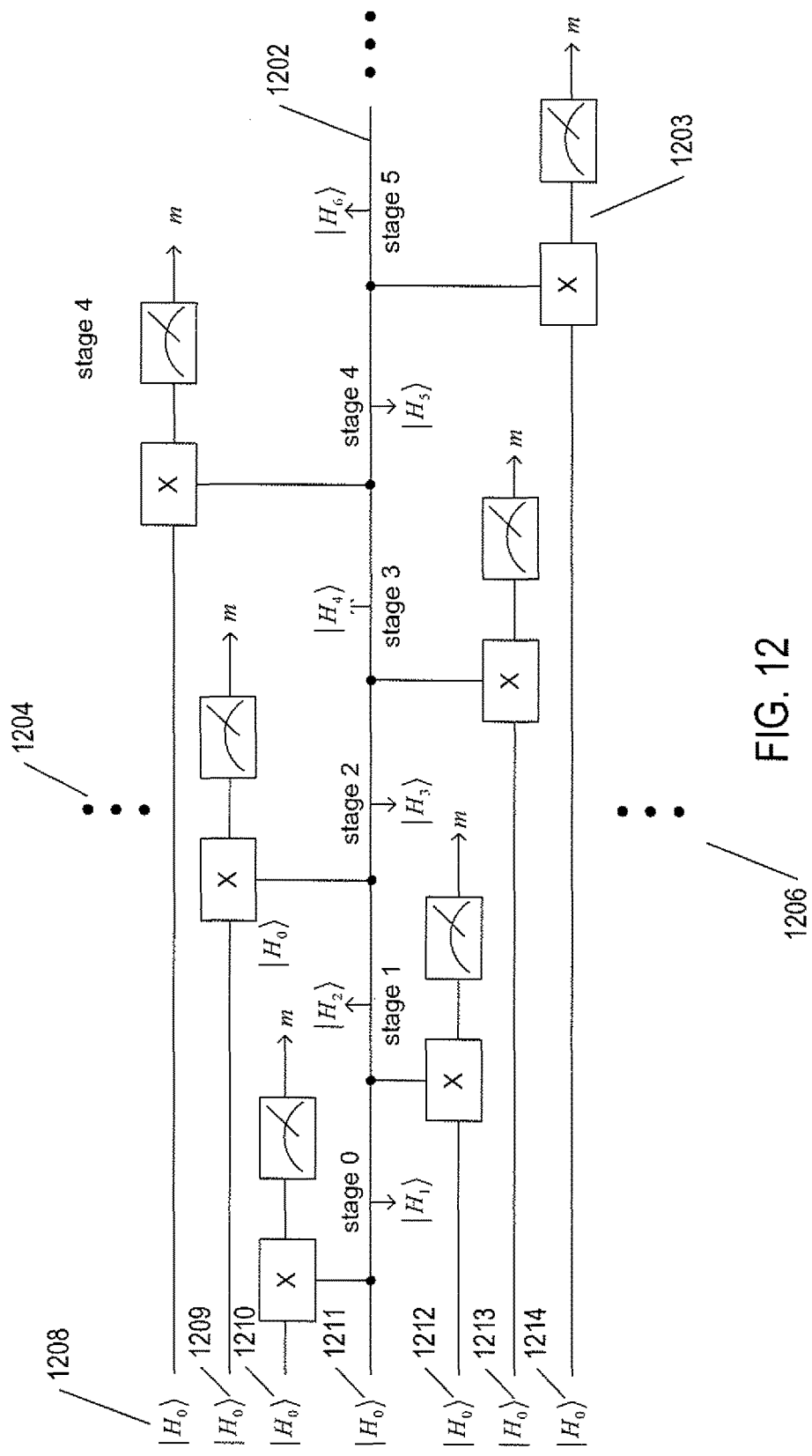
FIG. 12 illustrates a quantum-circuit subsystem of a unitary-quantum-gate implementation that generates a qubit with a state vector lying within the xz plane of the Bloch sphere and having a specific θ angle with respect to the z axis.

FIG. 12 illustrates a quantum-circuit subsystem of a unitary-quantum-gate implementation that generates a qubit with a state vector lying within the xz plane of the Bloch sphere and having a specific θ angle with respect to the z axis. The central quantum wire 1202 of the quantum-circuit subsystem represents a subject qubit that is operated on by successive stages of the quantum-circuit subsystem to produce an output qubit with a state vector lying in the xz plane of the Bloch sphere having a specified Bloch-sphere θ angle. In other words, the quantum-circuit subsystem outputs a qubit having a specified Bloch-sphere θ angle and a Bloch-sphere φangle equal to 0. The HSHX or $HS^\dagger$ operator can then be applied to the qubit to generate a qubit lying in the xy Bloch-sphere plane with a specified φ angle with respect to the x spatial axis. Because input magic-state qubits are noisy, the output qubit lies within an error cone with central axis equal to the target state vector and with the apex angle of the error cone representing a maximum displacement error multiplied by 2. The fidelity of the state of output qubit with respect to the target state is thus dependent on the error probability or angular displacement of the input magic-state qubits.

Note that FIG. 12 provides a simplified representation of the quantum-circuit subsystem. As discussed in greater detail, below, each stage of the quantum-circuit subsystem is probabilistic, and outputs the subject qubit with one of two possible rotations. For simplicity of illustration, FIG. 12 assumes a single output from each stage. As discussed below, when an undesired rotation is carried out by a given stage, the undesired rotation can be ameliorated by dynamically adding a stage to the quantum-circuit subsystem.

Note that a quantum wire within a quantum circuit represents a time line for a particular qubit rather than a conductive path, as in the case of classical electrical circuits. Quantum wire 1202 represents a time line along which an input qubit is successively subjected to operations corresponding to the operations carried out by successive stages of the quantum-circuit subsystem. As one example, the qubit may be located within a very tiny volume within a quantum computer and operated on by laser light of specific frequencies and durations. In alternative types of quantum computers, the operations may constitute controlled inputs of other types of electromagnetic radiation. In still other types of quantum computers, the operations or quantum gates may correspond to optical elements through which photons pass. It should also be noted that, in general, quantum computers and the currently described universal-rotation gate may include classical-computer control components that control the types and sequences of operations applied to qubits in quantum circuits. In the quantum-circuit subsystem shown in FIG. 12, for example, the number of stages may be determined dynamically by the control program that controls operation of the quantum-circuit subsystem.

Each stage of the quantum-circuit subsystem, such as stage 1203, passes the subject qubit corresponding to the central quantum wire 1202 and a magic-state qubit through a controlled-NOT gate followed by measurement of the resulting state of the magic-state qubit. In this respect, each stage is similar to the rotation quantum circuits discussed above with reference to FIGS. 10A-B. The subject qubit initially occupies the magic state $|H_0\rangle$. Following the controlled-NOT operation in stage 0, the subject qubit occupies one of two states $|H_{-1}\rangle$, when m=1, and $|H_1\rangle$, when m=0. In FIG. 12, it is assumed that the subject qubit is output from stage i in state $|H_{i+1}\rangle$. In the case that the subject qubit is output from stage i in state $|H_{-1}\rangle$, stage i is repeated, by the control program. The number of stages of the particular quantum-circuit subsystem is dynamically determined by a control component to be the number of stages necessary to rotate the subject qubit state vector into an error cone about a target state vector lying in the xz plane of the Bloch sphere. The probabilities of the measurement gate returning the two values of in are not 0.5, but are instead significantly biased towards the m=0 measurement. Should the state of the subject qubit become $|H_{-i}\rangle$, the quantum-circuit subsystem can be restarted with a new pair of input qubits in the $|H_0\rangle$ states. Ellipses 1204 and 1206 indicate that an arbitrary number of stages may be included in the quantum-circuit subsystem. Note that the input qubits with state $|H_0\rangle$ 1208-1214 are provided by the above-discussed offline resources, such as magic-state distilleries.

Figure 13A:
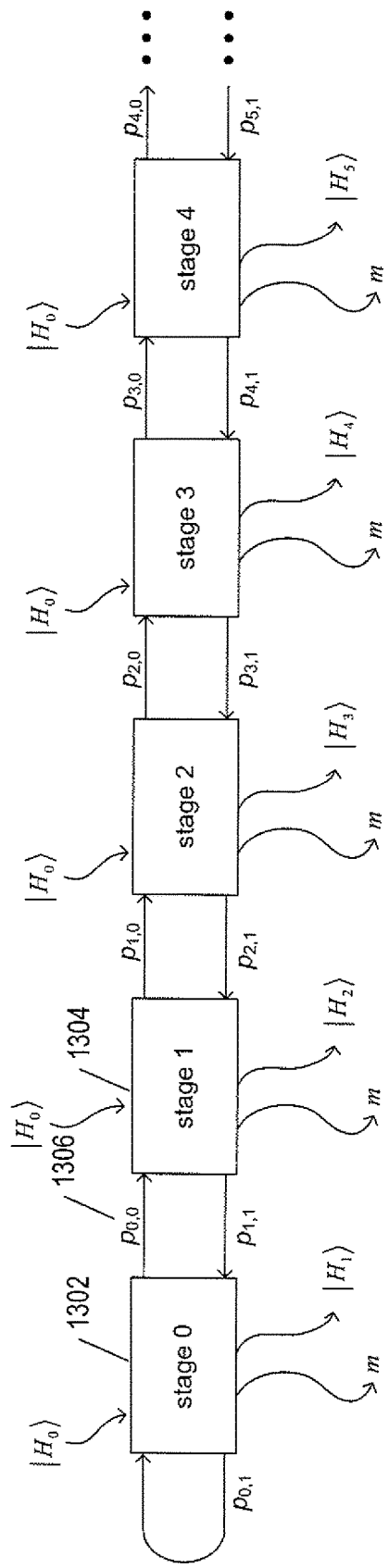
FIG. 13A provides an alternative illustration of the quantum-circuit subsystem discussed above with reference to FIG. 12.

FIG. 13A provides an alternative illustration of the quantum-circuit subsystem discussed above with reference to FIG. 12. In FIG. 13, rectangles, such as rectangle 1302, represent the stages of the quantum-circuit subsystem, each containing a controlled-NOT gate and a measurement gate. The subject qubit advances from a first stage i, such as stage 1302, to a second stage i +1, such as stage 1304, with a probability equal to the probability of measurement of m=0 in stage i, $p_{i,0}$, such as probability $p_{0,0}$ 1306 for stage 0. When the stage succeeds or, in other words, when measurement within the stage yields the value m=0, stage i outputs the subject qubit in state $|H_{i+1}\rangle$. When a stage i fails, then stage i−1 is repeated. Stage i fails with the probability $p_{i,1}$.

As discussed below, the rotation angles corresponding to each of a series of successive stages within the quantum-circuit subsystem have specific values for each type of quantum-circuit subsystem. Thus, a particular type of quantum-circuit subsystem k can provide θ rotations selected from a set of θ rotations characteristic of the particular type of quantum-circuit subsystem. In other words, a quantum-circuit subsystem k can produce any of a set of θ rotations $\{\theta_1^k, \theta_2^k, \theta_3^k, \ldots\}$ where the subscript i for an element in the set represents output from successful application of stage i −1 of the quantum-circuit subsystem and the superscript k indicates the particular quantum-circuit subsystem.

Figure 13B:
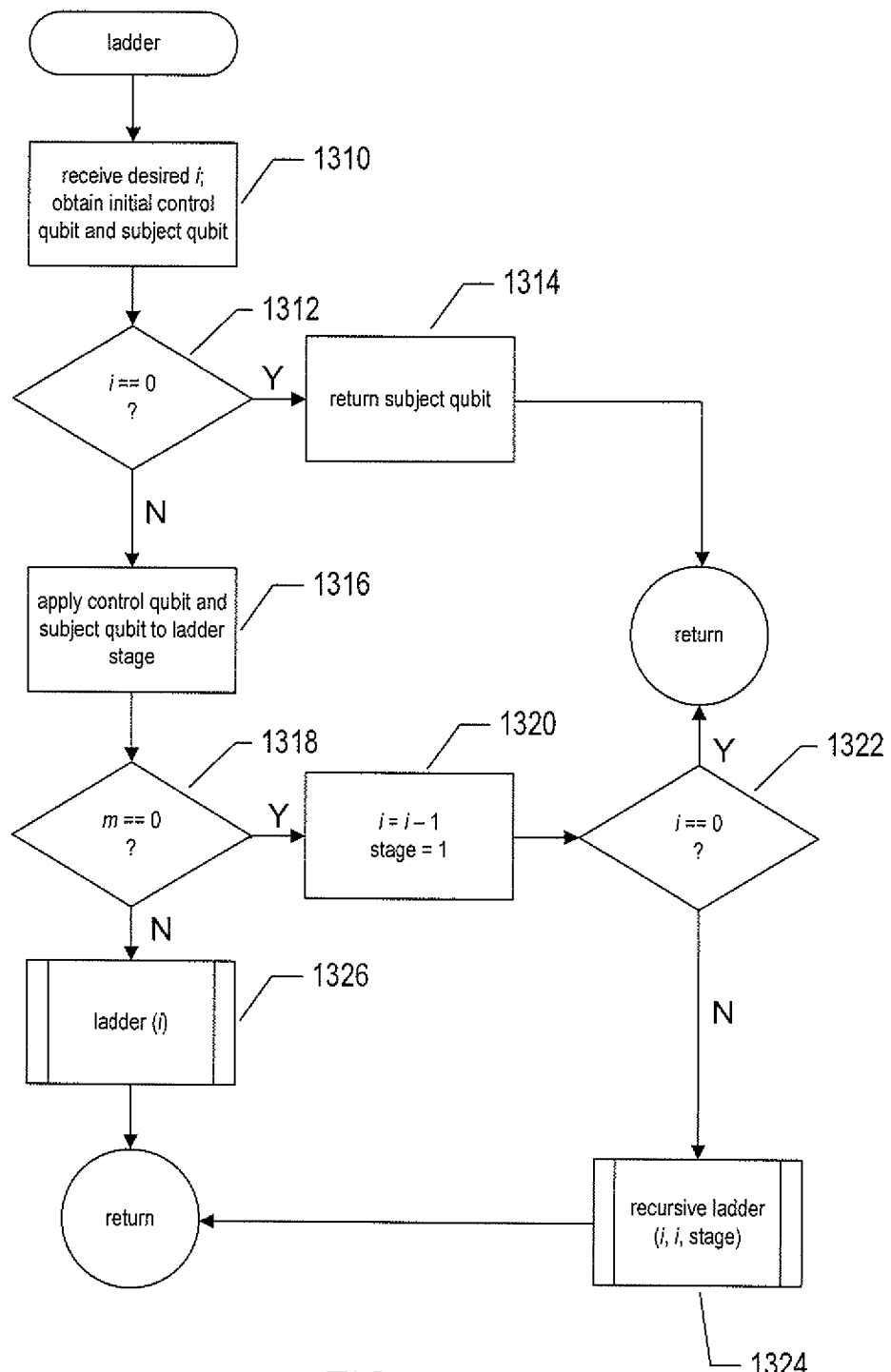
FIGS. 13B-C provide control-flow-diagram illustrations of a control program that controls the ladder-like quantum-circuit subsystem shown in FIGS. 12 and 13A.
Figure 13C:
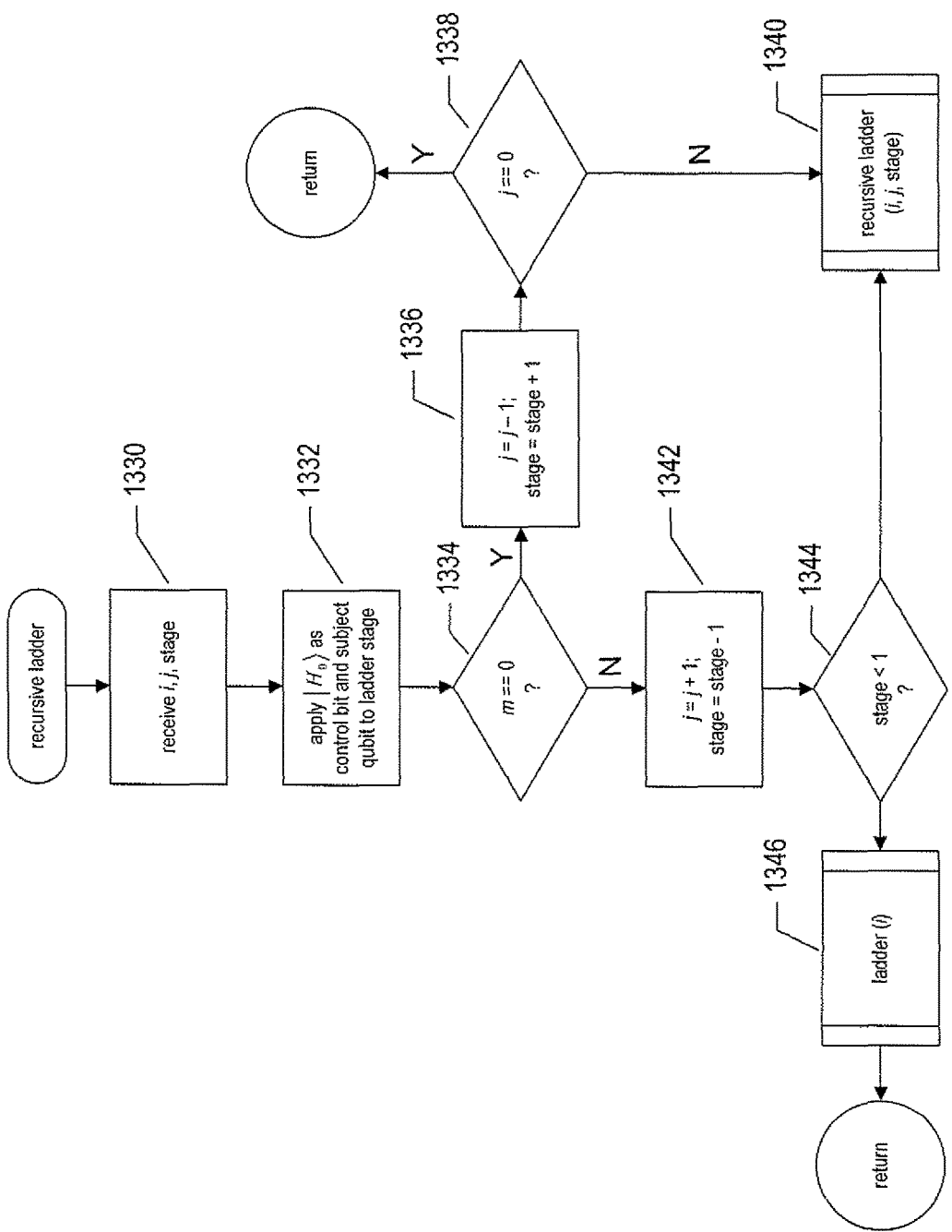

FIGS. 13B-C provide control-flow-diagram illustrations of a control program that controls the ladder-like quantum-circuit subsystem shown in FIGS. 12 and 13A. In step 1310, the control program "ladder" receives the desired state index i and arranges to obtain the subject qubit on which successive rotations are to be performed as well as an initial control qubit. In the example quantum-circuit subsystem in FIG. 12, both the subject qubit and the control qubit input to the first stage are qubits in state $|H_0\rangle$. As discussed below, the control qubit may have other states and may be obtained from resource-state factories that prepare the control qubit from two or more magic states. In the case that i is 0, as determined in step 1312, the subject qubit is returned without further processing, in step 1314. Otherwise, the control qubit is applied to the first stage of the quantum-circuit subsystem along with the subject qubit in step 1316. When measurement of the state of the control qubit, following the controlled-NOT operation, returns m=0, as determined in step 1318, then the index i is decremented and a local variable stage is set to 1, in step 1320. Following step 1320, if index i is now equal to 0, as determined in step 1322, then the subject qubit is returned without further processing. Otherwise, the routine "recursive ladder" is called, in step 1324, in order to carry out subsequent stages of the ladder-like quantum-circuit subsystem. When the measured value m is not equal to 0, as determined in step 1318, then the routine "ladder" is called again in step 1326.

FIG. 13C provides a control-flow diagram for the routine "recursive ladder," called in step 1324 of FIG. 13B. This routine carries out the operations corresponding to all but the first stage of the ladder-like quantum-circuit subsystem. In step 1330, the routine "recursive ladder" receives three arguments: (1) i, the index of the desired rotation; (2) j, the number of stages yet to be applied to the subject qubit; and (3) stage, the current stage of the ladder-like quantum-circuit subsystem. In step 1332, the routine "recursive ladder" applies the subject qubit and a magic-state control qubit to the stage circuitry. When, following operation of the controlled-NOT gate, measurement of the state of the control qubit returns m =0, as determined in step 1334, the variable j is decremented and the variable stage is incremented in step 1336. When j is now 0, as determined in step 1338, the subject qubit is returned without further processing. Otherwise, the routine "recursive ladder" is recursively called in step 1340. When the measured value is not 0, as determined in step 1334, then, in step 1342, j is incremented and the variable stage is decremented. When the current value stored in the local variable stage is now less than 1, as determined in step 1344, the routine "ladder" is called in step 1346 in order to restart the quantum-circuit subsystem. Otherwise, the routine "recursive ladder" is called in step 1340.

Next, expressions for stage 0 and stage 1 of the quantum-circuit subsystem, discussed above with reference to FIGS. 12 and 13, are provided, following with expressions for a generalized stage i. In the following, $\theta_0$ is defined as:

$$\theta_0 = \frac{\pi}{8}$$

and the eigenstate $|H_0\rangle$ is defined to be $|H\rangle$ or, in other words:

$$|H_0\rangle = \cos\theta_0|0\rangle + \sin\theta_0|1\rangle = \cos\frac{2\theta_0}{2}|0\rangle + \sin\frac{2\theta_0}{2}|1\rangle.$$

The second of the above expressions emphasizes the fact that the Bloch-sphere $\theta$ value for eigenstate $|H_0\rangle$ is $$\frac{\pi}{4}$$

because the basis-vector coefficients corresponding to the $\theta$ angle in the Bloch sphere are expressed as $$\frac{\theta}{2}.$$

Thus, eigenstate $|H_0\rangle$ has a Block-sphere $\theta$ angle of $$\frac{\pi}{4}.$$

The two-qubit input state for stage 0 of the quantum-circuit subsystem is, therefore:

$$|H_0\rangle|H_0\rangle = \cos\theta_0|0\rangle + \sin\theta_0|1\rangle \otimes \cos\theta_0|0\rangle + \sin\theta_0|1\rangle,$$
$$= \cos^2\theta_0|00\rangle + \cos\theta_0\sin\theta_0|01\rangle + \sin\theta_0\cos\theta_0|10\rangle + \sin^2\theta_0|11\rangle,$$
$$= \cos^2\theta_0|00\rangle + \cos\theta_0\sin\theta_0(|01\rangle + |10\rangle) + \sin^2\theta_0|11\rangle.$$

Note that the left-hand $|H_0\rangle$ corresponds to the upper qubit and the right-hand $|H_0\rangle$ corresponds to the subject qubit that is rotated by successive stages of the quantum-circuit subsystem. Following the controlled-NOT gate of stage 0, with the controlled-NOT gate represented by operator $\Lambda(X)$, the two-qubit state within stage 0 prior to the measurement operator is:

$$\Lambda(X)|H_0\rangle|H_0\rangle = \cos^2\theta_0|00\rangle + \cos\theta_0\sin\theta_0(|10\rangle + |11\rangle) + \sin^2\theta_0|01\rangle.$$

As can be seen by comparing the two-qubit state prior to and after the controlled-NOT gate, the controlled-NOT gate flips the first binary number in the expression for the 2-qubit basis vector when the second binary number is 1. Following the measurement gate in the first stage, the state of the subject qubit is:

$$|H_1\rangle = \begin{cases} m=0, & \left(\frac{1}{\cos^4\theta_0 + \sin^4\theta_0}\right)(\cos^2\theta_0|0\rangle + \sin^2\theta_0|1\rangle), \\ m=1, & \frac{1}{\sqrt{2}}|0\rangle + \frac{1}{\sqrt{2}}|1\rangle. \end{cases}$$

The expression for the m=0 state can be simplified by defining the angle $\theta_1$ so that:

$$\cos\theta_1|0\rangle + \sin\theta_1|1\rangle = \frac{\cos^2\theta_0}{\cos^4\theta_0 + \sin^4\theta_0}|0\rangle + \frac{\sin^2\theta_0}{\cos^4\theta_0 + \sin^4\theta_0}|1\rangle.$$

An expression for $\theta_1$ in terms of $\theta_0$ is obtained by:

$$\frac{\cos\theta_1}{\sin\theta_1} = \cot(\theta_1) = \frac{\frac{\cos^2\theta_0}{\cos^4\theta_0 + \sin^4\theta_0}}{\frac{\sin^2\theta_0}{\cos^4\theta_0 + \sin^4\theta_0}} = \frac{\cos^2\theta_0}{\sin^2\theta_0} = \cot^2\theta_0.$$

The above expression can be used to generate the target rotation $\theta_1$ form $\theta_0$. Thus, when stage 0 succeeds or, in other words, when m=0 in stage 0, then the subject qubit output from stage 0 has state $|H_1\rangle$:

$$|H_1\rangle = \cos\theta_1|0\rangle + \sin\theta_1|1\rangle.$$

The probabilities for success and failure of stage 0 are computed to be:

$$p_{0,0} = \cos^4\theta_0 + \sin^4\theta_0 = 0.75,$$

$$p_{0,1} = 1 - p_{0,0} = 0.25.$$

Next, similar expressions are derived for stage 1 of the quantum-circuit subsystem discussed above with reference to FIGS. 12 and 13:

$$|H_0\rangle|H_1\rangle = \cos\theta_0\cos\theta_1|00\rangle + \cos\theta_0\sin\theta_1|01\rangle + \sin\theta_0\cos\theta_1|10\rangle + \sin\theta_0\sin\theta_1|11\rangle,$$

$$\Lambda(X)|H_0\rangle|H_1\rangle = \cos\theta_0\cos\theta_1|00\rangle + \sin\theta_0\sin\theta_1|01\rangle + \sin\theta_0\cos\theta_1|10\rangle + \cos\theta_0\sin\theta_1|11\rangle,$$
$$= \begin{cases} m=0, \cos\theta_0\cos\theta_1|0\rangle + \sin\theta_0\sin\theta_1|1\rangle, \\ m=1, \sin\theta_0\cos\theta_1|0\rangle + \cos\theta_0\sin\theta_1|1\rangle, \end{cases}$$

define $\theta_2$, so that $\cos\theta_2|0\rangle + \sin\theta_2|1\rangle =$ $$\frac{\cos\theta_0\cos\theta_1}{(\cos\theta_0\cos\theta_1)^2 + (\sin\theta_0\sin\theta_1)^2}|0\rangle +$$

$$\frac{\sin\theta_0\sin\theta_1}{(\cos\theta_0\cos\theta_1)^2 + (\sin\theta_0\sin\theta_1)^2}|1\rangle,$$

-continued $$\frac{\cos\theta_2}{\sin\theta_2} = \cot\theta_2$$

$$= \frac{\cos\theta_0\cos\theta_1}{\sin\theta_0\sin\theta_1}$$

$$= \left(\frac{\cos\theta_0}{\sin\theta_0}\right)\left(\frac{\cos\theta_1}{\sin\theta_1}\right)$$

$$= \frac{\cos\theta_0}{\sin\theta_0}\frac{(\cos\theta_0)^2}{(\sin\theta_0)^2}$$

$$= \frac{\cos^3\theta_0}{\sin^3\theta_0},$$

$$\cot\theta_2 = \cot^{2+1}\theta_0,$$

$$p_{1,0} = .8266,$$

$$p_{1,1} = .1734.$$

Finally, general expressions for stage i are provided:

$$|H_i\rangle = \cos\theta_i|0\rangle + \sin\theta_i|1\rangle,$$

$$\cot\theta_i = \cot^{i+1}\theta_0,$$

$$|H_0\rangle|H_i\rangle = \cos\theta_0\cos\theta_1|00\rangle + \sin\theta_0\sin\theta_i|11\rangle +$$
$$\cos\theta_0\sin\theta_i|01\rangle + \sin\theta_0\cos\theta_i|10\rangle,$$

$$\Lambda(X)|H_0\rangle|H_i\rangle = \cos\theta_0\cos\theta_i|00\rangle + \sin\theta_0\sin\theta_i|10\rangle +$$
$$\cos\theta_0\sin\theta_i|01\rangle + \sin\theta_0\cos\theta_i|11\rangle,$$

$$= \begin{cases} m = 0, \cos\theta'|0\rangle + \sin\theta'|1\rangle, \\ m = 1, \cos\theta''|0\rangle + \sin\theta''|1\rangle, \end{cases}$$

$$= \begin{cases} m = 0, |H_{i+1}\rangle, \\ m = 1, |H_{i+1}\rangle, \end{cases}$$

where $$\cot\theta' = \cot\theta_i\cot\theta_0 = \cot^{i+2}\theta_0 = \cot\theta_{i+1},$$

$$\cot\theta'' = \cot\theta_i\tan\theta_0 = \cot^i\theta_0 = \cot\theta_{i-1}.$$

$$p_{i,0} = \cos^2\theta_i\cos^2\theta_0 + \sin^2\theta_i\sin^2\theta_0.$$

The probability of success for stage i, $p_{i,0}$, ranges from $$\frac{3}{4},$$

for the first stage, up to a value approaching $$\cos^2\frac{\pi}{8}.$$

The expression $\cot\theta' = \cot\theta_i \cot\theta_0 = \cot^{1+2}\theta_0$ can be used to compute the set of target rotation angles that can be produced by the quantum-circuit subsystem. Note that, as a result of $p_{i,0} - p_{i,1} \geq 0.5$, there is a favorable probability, at each stage i of the quantum circuit, or proceeding to the next highest state $|H_i\rangle$, with the probability of forward progress increasing with increasing i.

Figures 14, 15:
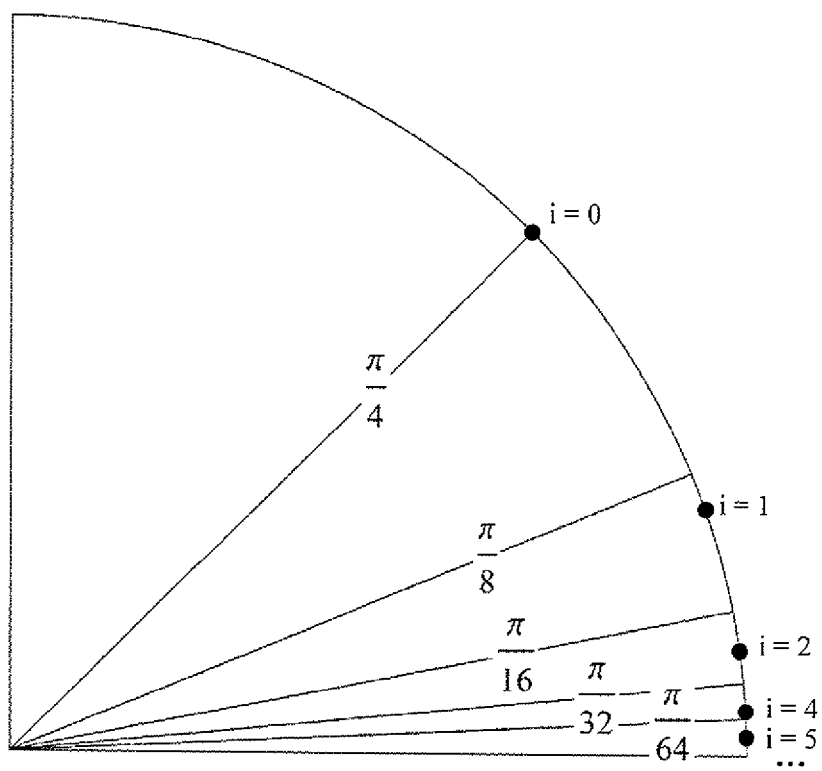
FIG. 14 provides a table of rotation values, in radians, for the state vectors of a qubit produced by successful operation of each of stages i=0 through i=16 of the quantum-circuit subsystem discussed above with reference to FIG. 1.
FIG. 15 illustrates the rotation angles of the state vectors of the subject qubit produced by the quantum-circuit subsystem.

FIG. 14 provides a table of rotation values, in radians, for the state vectors of a qubit produced by successful operation of each of stages i=0 through i=16 of the quantum-circuit subsystem discussed above with reference to FIG. 1. The rotation angles of the state vectors of the subject qubit produced by the quantum-circuit subsystem are illustrated in FIG. 15. In FIG. 15, the rotation angles of the state vectors produced by successive stages of the above-discussed quantum-circuit subsystem can be seen to decrease geometrically.

Figure 16:
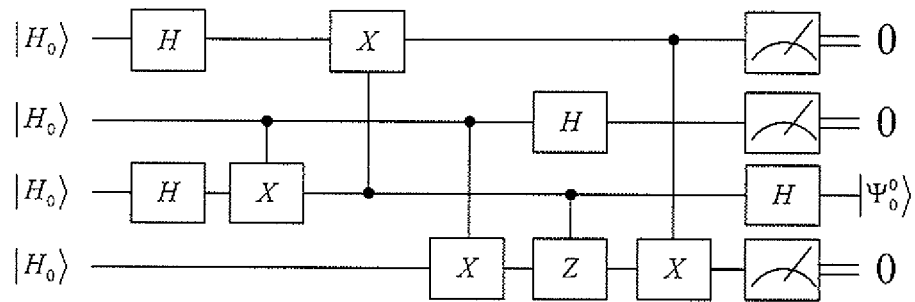
FIGS. 16-18 show quantum circuits for resource factories that prepare additional types of control qubits for the quantum-circuit subsystem discussed with reference to FIGS. 13A-C.
Figure 17:
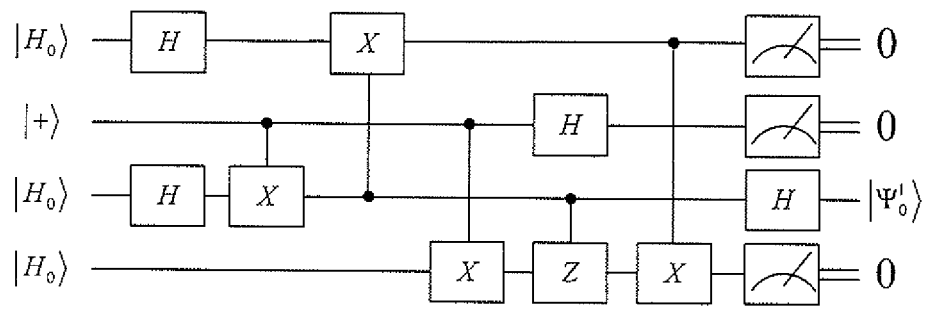
Figure 18:
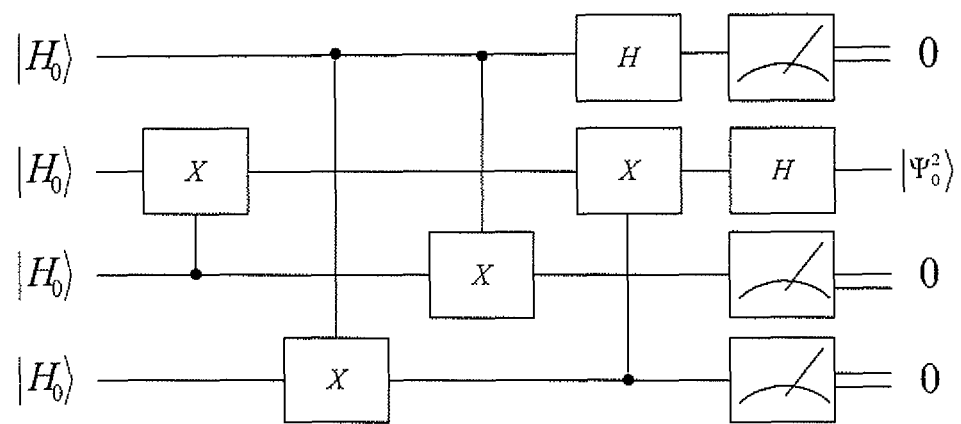

The quantum-circuit subsystem discussed above with reference to FIGS. 12 and 13 is but one of many different related subsystems that can be devised to generate qubits with state vectors lying in the xz Bloch-sphere plane with particular target θ values. FIGS. 16-18 show quantum circuits for resource factories that prepare additional types of subject qubits for the quantum-circuit subsystem discussed with reference to FIGS. 13A-C. When applied, as subject qubits, to the quantum-circuit subsystem discussed with reference to FIGS. 13A-C, additional sets of characteristic rotations $\{\theta_1^2, \theta_2^2, \theta_3^2, \ldots\}$, $\{\theta_1^3, \theta_2^3, \theta_3^3, \ldots\}$, and $\{\theta_1^4, \theta_2^4, \theta_3^4, \ldots\}$ are produced. The quantum circuit illustrated in FIG. 16 generates the state $|\Psi_0^0\rangle$ with probability 0.320, where state $|\Psi_0^0\rangle$ can be expressed as:

$$|\Psi_0^0\rangle = \cos\phi_0^0|0\rangle + \sin\phi_0^0|1\rangle,$$

$$\phi_0^0 = \frac{\pi}{2} - \cot^{-1}\left(\frac{2 + 3\sqrt{2}}{6 + 5\sqrt{2}}\right) \approx 0.446.$$

The quantum circuit shown in FIG. 17 produces the state $|\Psi_0^1\rangle$ with a probability of 0.232, expressed as:

$$|\Psi_0^1\rangle = \cos\phi_0^1|0\rangle + \sin\phi_0^1|1\rangle,$$

$$\phi_0^1 = \frac{\pi}{2} - \cot^{-1}\left(\frac{2\sqrt{2}}{3 + \sqrt{2}}\right) \approx 0.570.$$

The quantum circuit shown in FIG. 18 produces the state $|\Psi_0^2\rangle$ with a probability of 0.344, expressed as:

$$|\Psi_0^2\rangle = \cos\phi_0^2|0\rangle + \sin\phi_0^2|1\rangle,$$

$$\phi_0^2 = \frac{\pi}{2} - \cot^{-1}\left(\frac{7}{6\sqrt{2}}\right) \approx 0.690.$$

The resource states $|\Psi_0^0\rangle$, $|\Psi_0^1\rangle$, and $|\Psi_0^2\rangle$, when used as the subject-qubit input to the first stage of the ladder-like quantum-circuit subsystem, prepare qubits with additional xz-Bloch-sphere-plane rotations selected from the additional sets of rotations $\{\theta_1^2, \theta_2^2, \theta_3^2, \ldots\}$, $\{\theta_1^3, \theta_2^3, \theta_3^3, \ldots\}$, and $\{\theta_1^4, \theta_2^4, \theta_3^4, \ldots\}$, respectively. Use of the different resource states $|H_0\rangle$, $|\Psi_0^0\rangle$, $|\Psi_0^1\rangle$, and $|\Psi_0^2\rangle$ as the subject qubit for the first stage of the ladder-like quantum-circuit subsystem illustrated in FIG. 13 essentially generates four different quantum-circuit subsystems 1, 2, 3, and 4.

FIG. 19 illustrates the θ angles available from quantum-circuit subsystems based on FIGS. 12-13 and 16-18, using the illustration conventions of FIG. 15. FIG. 20 provides a table of the θ angles of xz-Bloch-sphere-plane state vectors, in radians, produced by the first nine stages of each of the various types of quantum-circuit subsystems discussed above. Additional types of ladder-like quantum-circuit subsystems that employ stages that carry out different operations on the subject qubit are also possible. Again, the qubit states produced by these quantum-circuit subsystems provide a large number of non-stabilizer states that can be used as resources in a variety of different applications. In the next subsection, one such application is described.

Implementation of a Universal Qubit Rotation Operator

Figure 21A:
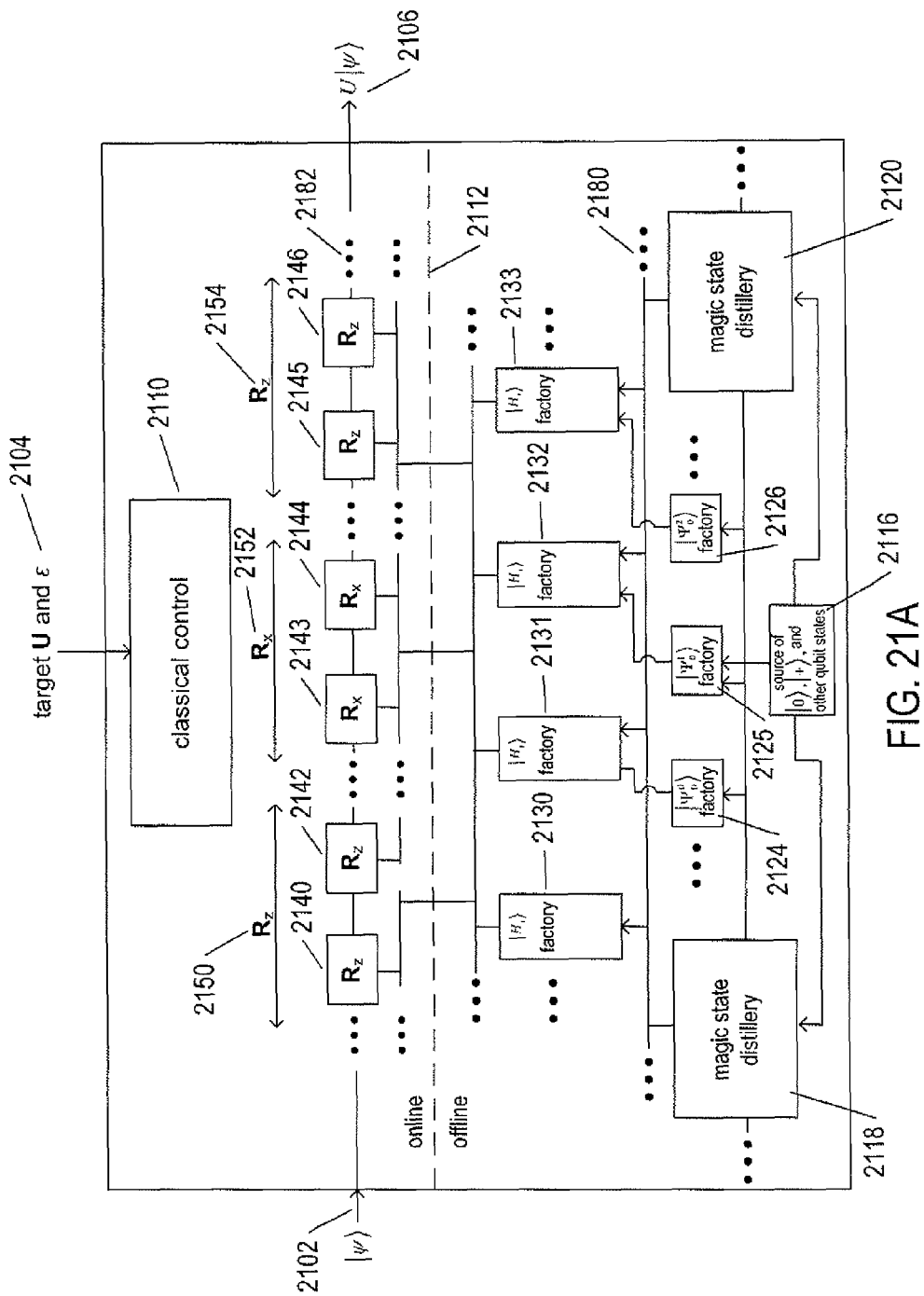
FIGS. 21A-C illustrate two different implementations of the universal quantum gate discussed above with reference to FIG. 8.
Figure 21B:
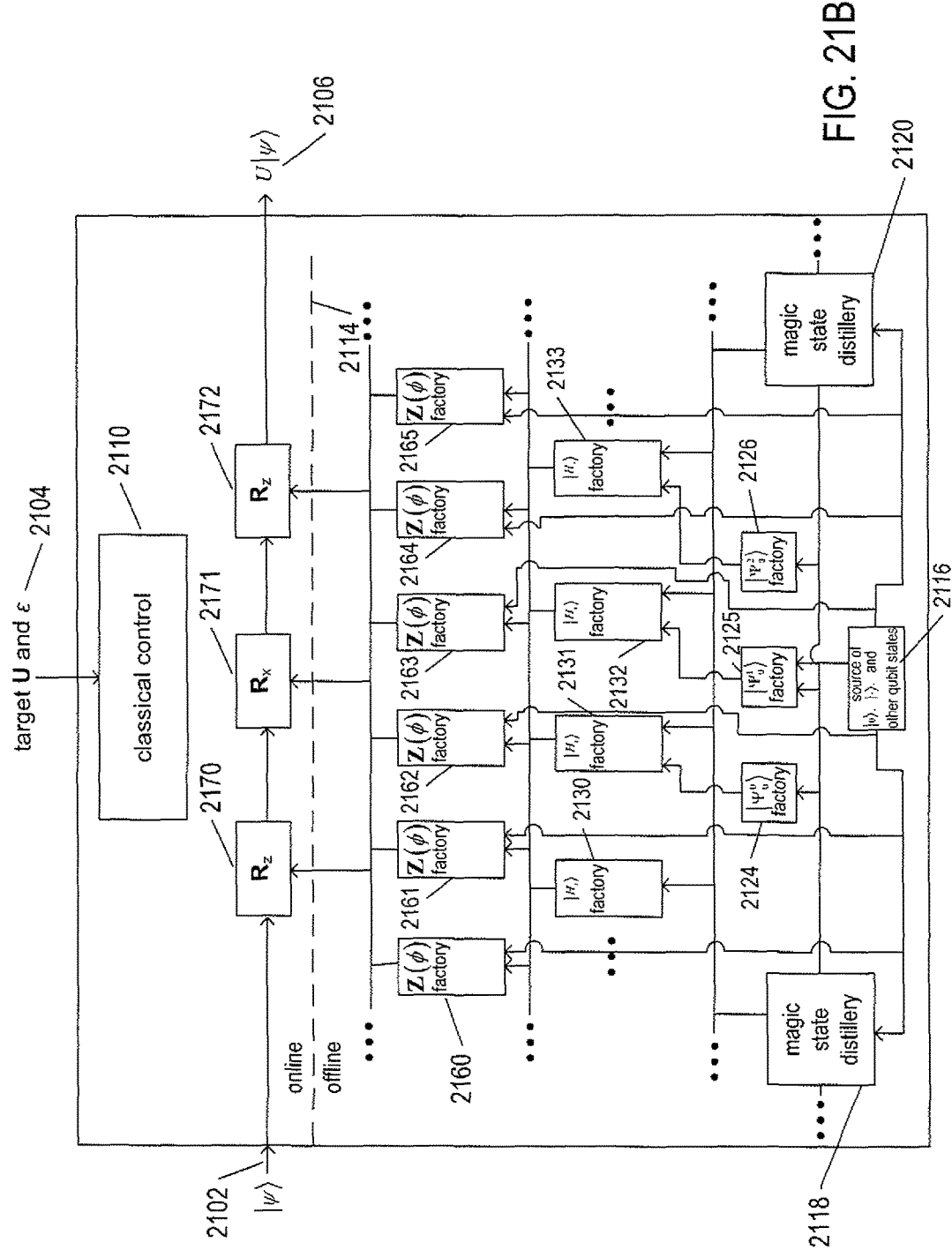
Figure 21C:
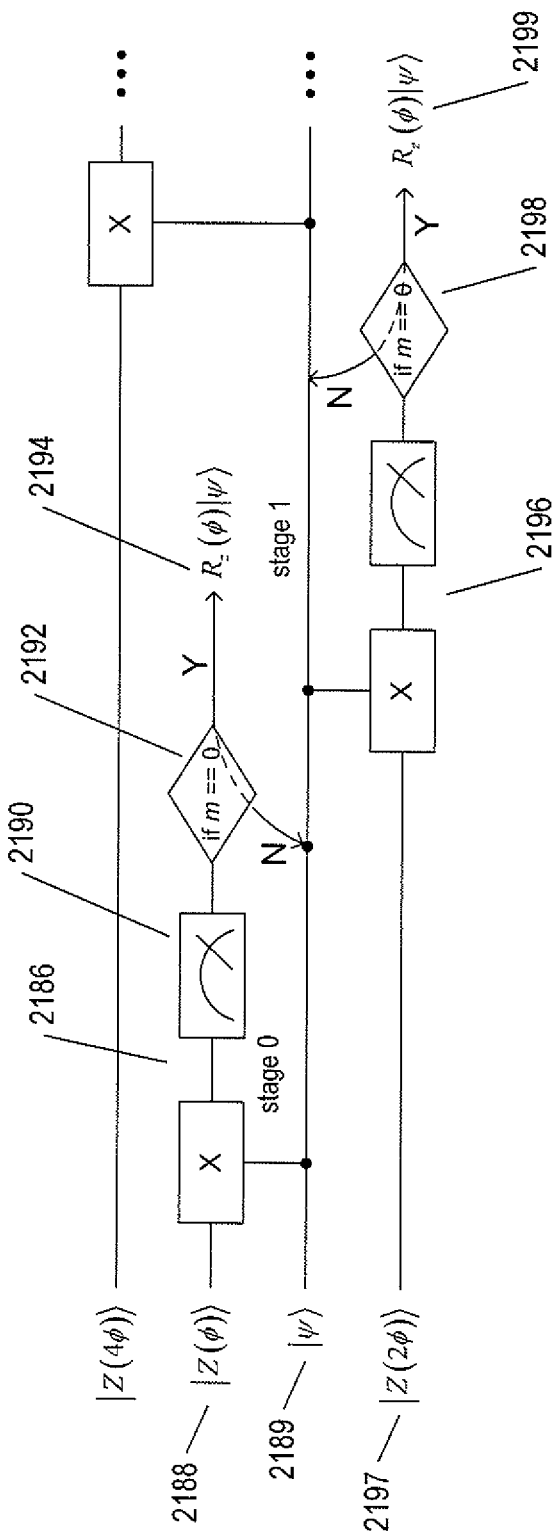

FIGS. 21A-C illustrate two different implementations of the universal quantum gate discussed above with reference to FIG. 8. FIGS. 21A-B employ similar illustration conventions to those used in FIG. 8, but include additional implementation details. As previously shown in FIG. 8, the inputs to the universal quantum gate include a subject qubit in state $|\psi\rangle$ 2102 as well as indications of a desired gate operation to perform, U, and a desired maximum error, $\epsilon$ 2104. The universal gate outputs $U|\psi\rangle$. In both the implementation shown in FIG. 21A and the implementation shown in FIG. 21B, the universal gate features a classical control component 2110, described below with reference to FIGS. 22A-D. In both figures, a dashed horizontal line, 2112 in FIG. 21A and 2114 in FIG. 21B, indicate a division between online processing and offline processing within the implementation. Both implementations include a source of standard-state qubits 2116 which are provided to two magic-state distilleries 2118 and 2120. Magic-state qubits are provided by the magic-state distilleries, in both implementations, to first-level resource-state factories 2124-2126 which prepare resource states $|\Psi_0^0\rangle$, $|\Psi_0^1\rangle$, and $|\Psi_0^2\rangle$, respectively. The $|\Psi_0^1\rangle$ factory 2125 also receives $|+\rangle$ states from source 2116, where the $|+\rangle$ state is expressed as:

$$|+\rangle = \frac{1}{\sqrt{2}}|0\rangle + \frac{1}{\sqrt{2}}|1\rangle.$$

The magic-state distilleries 2118-2120 additionally provide magic states to the second-level resource factories 2130-2133 which are ladder-like quantum-circuit subsystems of types k=1-4 discussed above with reference to FIGS. 12-13C and 16-18. These factories produce xy-block-sphere-plane qubits in states $|H_i\rangle$. The resource states produced by the second-level resource-state factories 2130-2133 are used as control bits for z rotation and x-rotation quantum circuits discussed above with reference to FIGS. 10A-B. In the implementation shown in FIG. 21A, the z-rotation and x-rotation circuits 2140-2146 apply rotations directly to the input subject qubit. A series of minor rotations that include minor rotations carried out by z-rotation circuits 2140 and 2142 implement a first major z rotation 2150, a second series of minor x rotations that include x rotations carried out by z-rotation circuits 2143 and 2144 produce a second major x rotation 2152, and a third series of z rotations that include z rotations carried out by z-rotation circuits 2145-2146 carry out a second z rotation 2154. As discussed above, the three major rotations 2150, 2152, and 2154, in turn, carry out the U unitary-quantum-gate operation on the input subject qubit.

By contrast, in the second implementation of the universal quantum circuit shown in FIG. 21B, there is a third level of resource-state factories 2160-2165, each a z rotation circuit, such as that shown in FIG. 10A, that prepares a control qubit $|Z(\phi)\rangle$ in the xy block-sphere plane. These $|Z(\phi)\rangle$ control qubits are, in turn, used to control higher-level z rotation and x-rotation circuits 2170-2172.

Thus, comparing the implementation shown in FIG. 21A to that shown in FIG. 21B, the implementation in FIG. 21B has moved the online processing related to minor rotations, in the implementation shown in FIG. 21A, to offline resource factories 2160-2165. However, as discussed in greater detail below, the rotation quantum circuits 2170-2172 in the implementation shown in FIG. 21B are still probabilistic, and each of these rotation circuits may involve application of multiple rotation operations.

In FIGS. 21A-B, the many occurrences of ellipses, such as ellipsis 2180 in FIG. 21A, are used to indicate that additional resource-state factories may be included in alternative implementations. Other ellipses, such as ellipsis 2182 in FIG. 21A, indicate that certain quantum circuits are probabilistic and the number of applications in a circuit may vary, depending on the outcome of each application. It should also be noted that the second-level resource factories 2130-2133 may include, in both implementations, a final application of the HSHX or HS$^\dagger$ gate, discussed above, in order to rotate a qubit with a state vector lying in the xz block-sphere plane into the xy block-sphere plane.

FIG. 21C shows an implementation of the rotation circuit 2170 in FIG. 21B. In a first stage 2186, a control qubit $|Z(\phi)\rangle$ 2188 and the subject qubit 2189 are input to a controlled-NOT gate followed by measurement of the state of the control qubit 2190. When measurement produces m=0, determined by logic step 2192, then a successful rotation has been carried out and the subject qubit has the desired state 2194. Otherwise, a second stage 2196 is applied to the subject qubit with a control qubit 2197 in state $|Z(2\phi)\rangle$. In other words, when the first stage fails, the subject qubit has been rotated by $\phi$ in the opposite direction from the desired direction, as a result of which a rotation of $2\phi$ is now needed. When the second stage succeeds, as determined in logic step 2198, then the subject qubit has the desired state 2199 and, otherwise, an additional stage is applied. Therefore, as shown in FIG. 21B, each major rotation circuit 2170-2172 may consume multiple resource states produced by the third-level resource-state factories 2160-2165. FIG. 21C shows a z-rotation circuit. The x-rotation circuit 2171 includes a controlled-Z gate rather than a controlled-NOT gate.

Figure 22A:
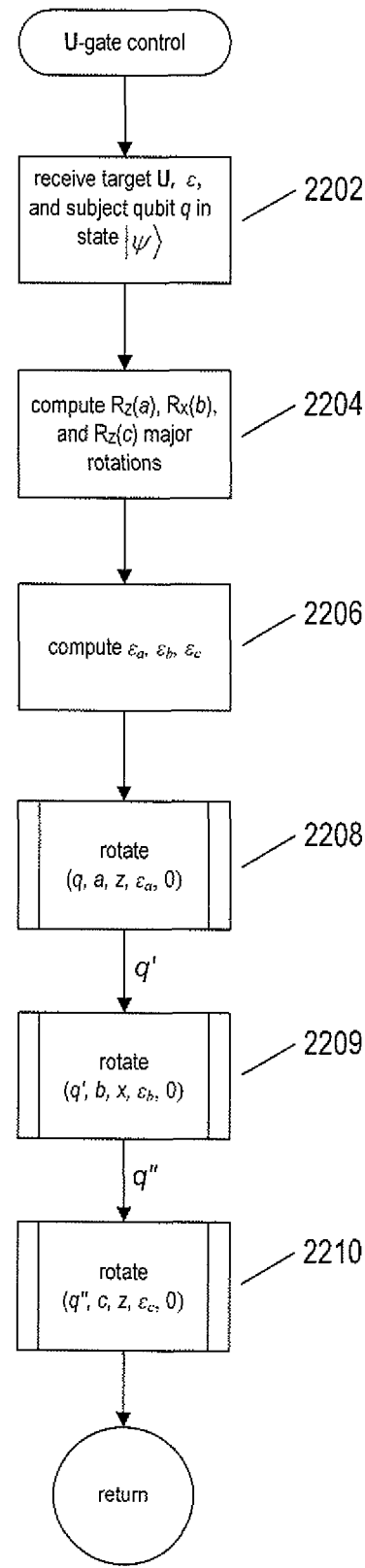
FIGS. 22A-D provide control-flow diagrams that illustrate control of the universal quantum gate shown in FIG. 21.
Figure 22B:
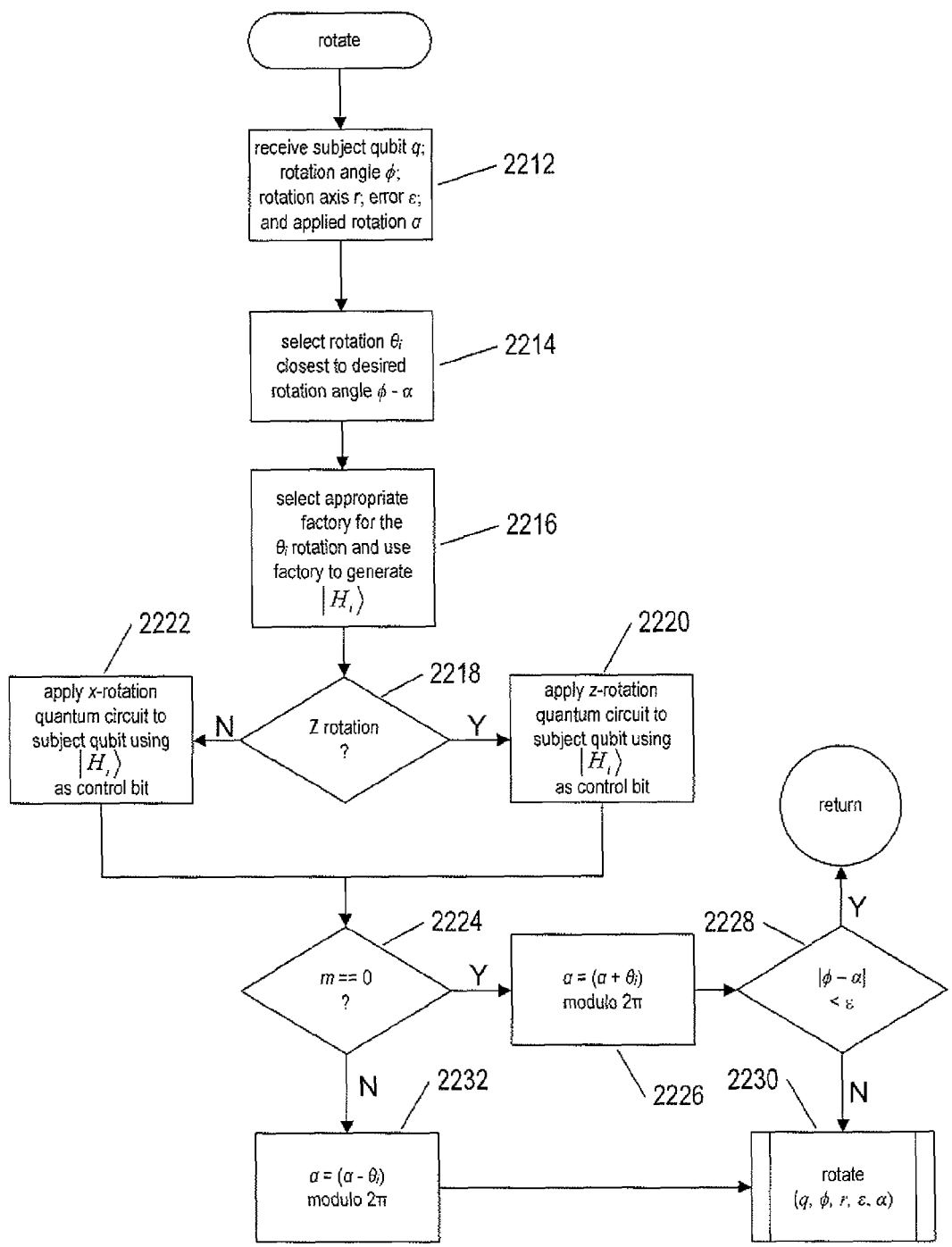

FIGS. 22A-D provide control-flow-diagram illustrations of the classical control for the two different implementations of the universal gate shown in FIGS. 21A-B. FIGS. 22A-B illustrate the classical control for the first implementation of the universal gate shown in FIG. 21A. FIG. 22A shows a control-flow diagram for the routine "U-gate control." In step 2202, the routine "U-gate control" receives a target U, a specified maximum error $\epsilon$, and the subject qubit in state $|\Psi\rangle$. In step 2204, the routine "U-gate control" computes the angles for the major z and x rotations. In step 2206, the routine "U-gate control" computes maximum error bounds $\epsilon_a$, $\epsilon_b$, and $\epsilon_c$ for the three major rotations. Then, in steps 2208-2210, the routine "U-gate control" calls a subroutine "rotate" to carry out the three major rotations $R_z(a)$, $R_x(b)$, and $R_z(c)$ on the subject qubit.

FIG. 22B provides a control-flow diagram that illustrates the subroutine "rotate" called in steps 2208-2210 in FIG. 22A. In step 2212, the routine "rotate" receives the subject qubit q, the desired rotation angle $\phi$, an indication of the rotation axis for the rotation r, the error bound for the rotation $\epsilon$, and an indication of the rotation already applied $\alpha$. In step 2214, the routine "rotate" selects a rotation $\theta_i$ closest to the current desired rotation angle $\phi-\alpha$. In step 2216, the routine "rotate" selects an appropriate resource-state factory to produce the control qubit $|H_i\rangle$ for the rotation $\theta_i$ and uses the selected factory to generate the control qubit in state $|H_i\rangle$. The $|H_i\rangle$ states include $|H_0\rangle$, $|\Psi_0^0\rangle$, $|\Psi_0^1\rangle$, and $|\Psi_0^2\rangle$, and the various states produced by applying qubits in these states as subject qubits to the ladder-like quantum subsystem discussed with reference to FIGS. 12 and 13A. When the desired rotation is a z rotation, as determined from the input parameter r, in step 2218, a z-rotation quantum circuit is applied to the subject qubit using the resource-state $|H_i\rangle$ as the control qubit in step 2220. Otherwise, an x-rotation is applied in a similar step 2222. Following the application of the rotation circuitry, illustrated above in FIG. 10A or FIG. 10B, when the measurement in the rotation circuitry produces the value m=0, as determined in step 2224, the rotation succeeded and the variable a is updated, in step 2226, to indicate the present rotational state of the subject qubit. When the magnitude of the difference between the desired rotation angle $\phi$ and the current rotation angle $\alpha$ is less than $\epsilon$, as determined in step 2228, then the desired rotation is achieved and the routine "rotate" returns. Otherwise, the routine "rotate" is again called in step 2230 to apply an additional minor rotation to the subject qubit in order to rotate the subject qubit closer to the desired rotation angle $\phi$. When m does not equal 0, as determined in step 2224, then the applied rotation is opposite to that desired, and $\alpha$ is updated accordingly in step 2232 prior to again calling the routine "rotate" in step 2230. Although the rotation circuitry is probabilistic, the probability of achieving a useful rotation that places the subject qubit closer to the desired rotation $\phi$ quickly rises to near certainty with successive applications of the rotation circuitry.

Figure 22C:
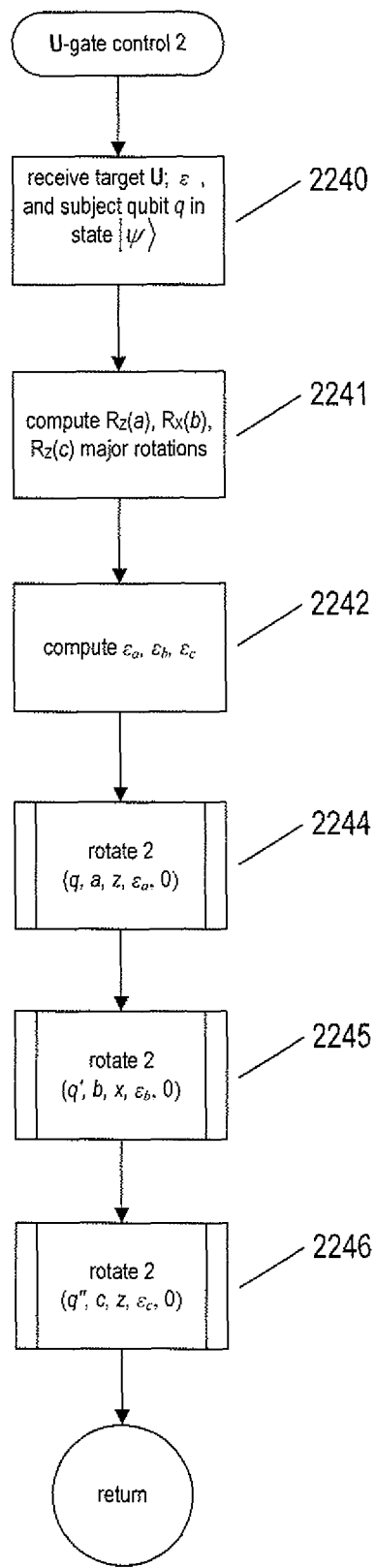
Figure 22D:
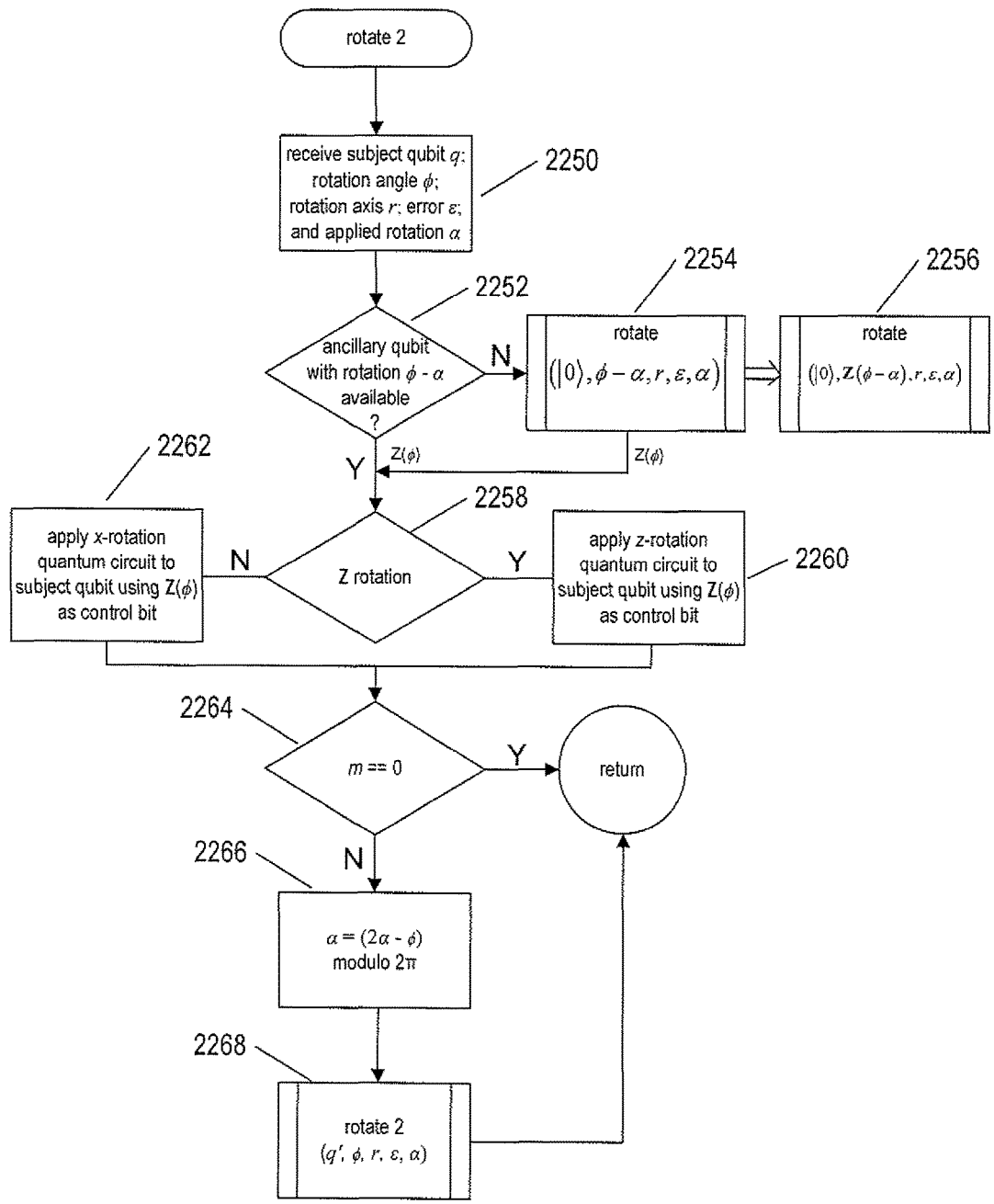

FIGS. 22C-D illustrate, using control-flow diagrams, the classical control for the implementation of the universal gate shown in FIG. 21B. The initial steps 2240-2242 are identical to the first steps of the routine "U-gate control" illustrated in FIG. 22A. The final three steps 2244-2246 of the routine "U-gate control 2" call the routine "rotate 2" rather than the routine "rotate" called in steps 2208-2210 of the routine "U-gate control."

FIG. 22D provides a control-flow diagram for the routine "rotate 2" called in steps 2244-2246 of FIG. 22C. Step 2250 is identical to step 2212 of the routine "rotate." In step 2252, the routine "rotate2" determines whether there is an ancillary qubit with the rotation $\phi-\alpha$ for the rotation axis r currently available from a third-level resource-state factory. When not, then, in step 2254, the routine "rotate" is called to control a third-level resource-state factory to produce the desired ancillary qubit with the desired rotation. In addition, an asynchronous call may be made to an additional resource-state factory, when one is available, to prepare an ancillary qubit with the rotation angle $2(\phi-\alpha)$ in case that the next-attempted rotation fails. When the desired rotation is about the z axis, as determined from the input parameter r in step 2258, the rotation is attempted by applying a z-rotation quantum circuit, in step 2260, using the $|Z(\phi)\rangle$ ancillary qubit as a control bit. Otherwise, in step 2262, an x-rotation is attempted. When, following the attempted rotation, the measured value m is equal to 0, as determined in step 2264, the rotation has succeeded and the qubit is in the desired state. Otherwise, a is updated to reflect an unsuccessful rotation in step 2266 and the routine "rotate 2" is again called in step 2268.

V-Gate Implementation

The $V_3$ gate is of increasing interest in quantum computing because the V basis provides advantages in approximating unitary quantum gates. The ladder-like quantum-circuit subsystem and T-gate implementation discussed in preceding subsections can be used to implement the $V_3$ gate. The $V_3$ gate can be described as:

$$V_3 = \frac{I + 2iZ}{\sqrt{5}},$$

$$= \frac{1}{\sqrt{5}} \begin{bmatrix} 1+2i & 0 \\ 0 & 1-2i \end{bmatrix}$$

$$= \frac{1+2i}{\sqrt{5}} \begin{bmatrix} 1 & 0 \\ 0 & e^{i\theta} \end{bmatrix},$$

where $$e^{i\theta} = \cos\theta + i\sin\theta = -\frac{3}{5} - i\frac{4}{5}.$$

This allows the calculation of the rotation about the z axis produced by the $V_3$ gate by:

$$\theta = \cos^{-1}\left(-\frac{3}{5}\right) = \sin^{-1}\left(-\frac{4}{5}\right) = 4.096 \text{ radians.}$$

The angle $\theta$ can be expressed in terms of an angle $\theta'$ by:

$$\theta = \theta' + \pi,$$

$$\theta' = \cos^{-1}\left(\frac{3}{5}\right).$$

It turns out that $\theta'$ is related to the rotation angle $2\theta_2$ produced by the second stage of the first ladder-like quantum-circuit subsystem, discussed above with reference to FIGS. 12 and 13A:

$$\theta' = 2\theta_2 + \frac{\pi}{4}.$$

Therefore, the rotation about the z axis produced by the $V_3$ gate can be expressed in terms of $\theta'$ as follows:

$$Z(\theta) = Z(\pi)Z(\theta'),$$

$$= Z(\pi)Z(2\theta_2)Z\left(\frac{\pi}{4}\right).$$

Defining an angle $\theta''$ as:

$$\theta'' = \frac{\pi}{2} - 2\theta_2,$$

the angle $2\theta_2$ can be expressed as:

$$2\theta_2 = \frac{\pi}{2} - \theta''.$$

Thus, the rotation about the z axis produced by the $V_3$ gate can be expressed as:

$$Z(\theta) = Z(\pi)Z(\tfrac{\pi}{4})Z(2\theta_2),$$
$$= Z(\pi)Z(\tfrac{\pi}{4})Z(\tfrac{\pi}{2})Z(-\theta''),$$
$$= Z(-\tfrac{\pi}{2})Z(\tfrac{\pi}{4})Z(-\theta'').$$

HSHX $|H_2\rangle$ species a z rotation of $$\tfrac{\pi}{2} - 2\theta_2$$

when used as a control bit for the z-rotation circuit. HSHX$|H_2\rangle$ also specifies a z rotation of $$-\tfrac{\pi}{2} + 2\theta_2,$$

since the z-rotation circuit is probabilistic and implements $\theta''$ when the measurement returns m=0 and $-\theta''$ when the measurement returns m=1, with a probability of 0.5 for each of the two possible results. Thus, the rotation about the z axis produced by the $V_3$ gate can be expressed in terms of $\theta''$ as:

$$Z(\theta) = Z(-\theta'')TS^\dagger,$$
$$= T^\dagger Z(-\theta'').$$

These operations commute, so they may be applied in any order. Alternatively, in order to achieve a z rotation of $\theta$, a $V_3$ gate may first carry out a z rotation of $2\theta_2$ followed by z rotations of $\pi$ and $$\tfrac{\pi}{4},$$

as noted above.

HS$^\dagger|H_2\rangle$ specifies a z rotation of $2\theta_2$ when used as the control bit for a z-rotation circuit. When the measurement following a z rotation using HS$^\dagger|H_2\rangle$ as the control bit returns m=0, a rotation of $2\theta_2$ has been carried out. The rotation about the z axis produced by the $V_3$ gate can be alternatively expressed as:

$$Z(\theta) = Z(\pi)TZ(2\theta_2).$$

Alternatively, $$Z(\theta) = Z(-\tfrac{\pi}{4})Z(-\tfrac{\pi}{2})Z(2\theta_2)$$

and $$Z(\theta) = T^\dagger S^\dagger Z(2\theta_2).$$

These operations also commute and can therefore be applied in any order.

Figure 23A:
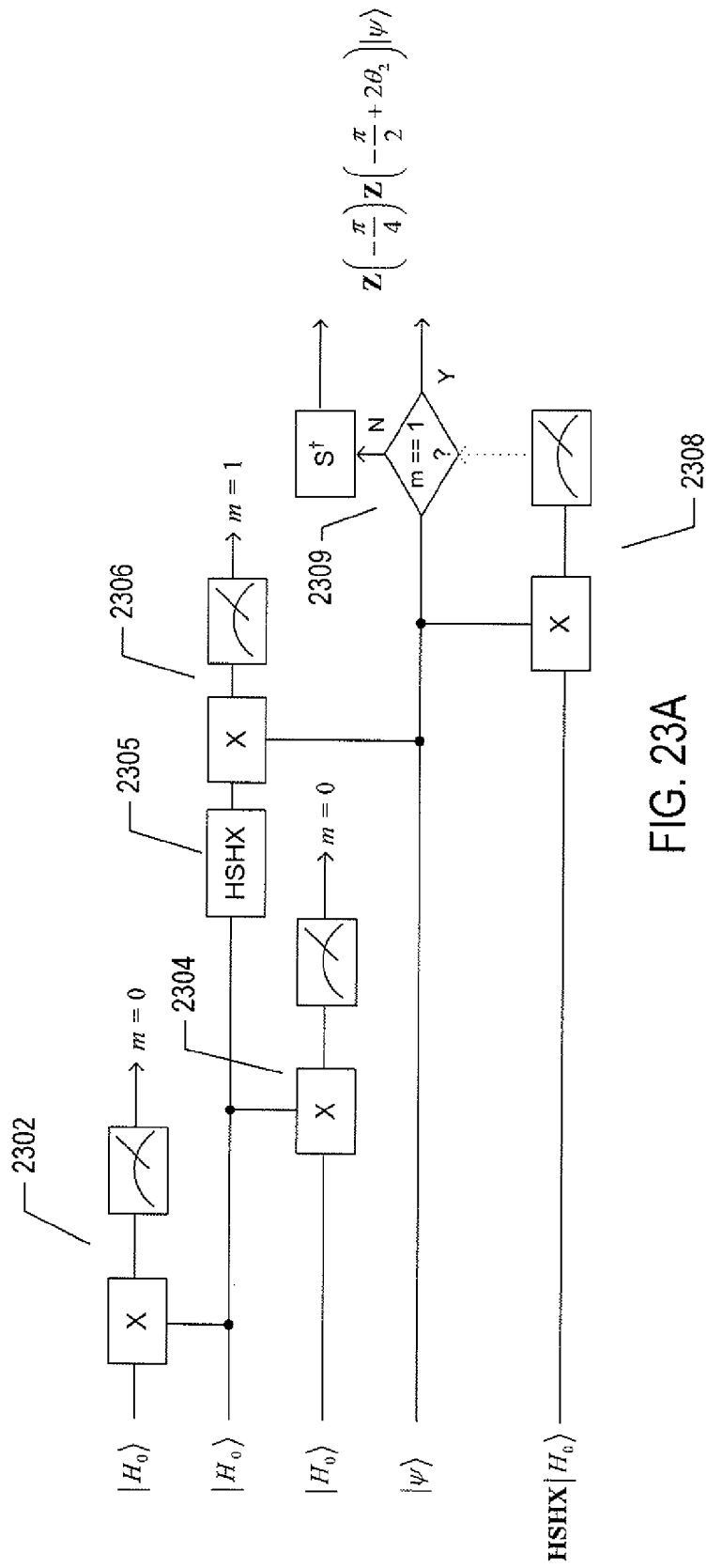
FIG. 23A-B shows an implementation of the $V_3$ quantum gate as a quantum circuit featuring elements of the above-discussed quantum circuits in previous subsections.

FIG. 23A shows a first implementation of the $V_3$ quantum gate as a quantum circuit featuring elements of the above-discussed quantum circuits in previous subsections. Two stages of the ladder-like quantum-circuit subsystem discussed with reference to FIGS. 12 and 13A, including stage 0 (2302) and stage 1 (2304), produce state $|H_2\rangle$, to which the HSHX operator is applied, by gate 2305, to produce a control qubit for rotating a subject qubit by $$-\tfrac{\pi}{2} + 2\theta_2$$

in the z-rotation circuit element 2306, with the rotation $$-\tfrac{\pi}{2} + 2\theta_2$$

produced when the measurement returns m=1. Then, the rotated subject qubit is rotated by $$-\tfrac{\pi}{4}$$

by a $T^\dagger$-gate element 2308, as discussed above with reference to FIG. 11. Of course, the $V_3$-gate implementation is probabilistic. The measured state value m in each measurement operation may produce either 0 or 1, as discussed above. The proper $V_3$ z rotation is produced only in the case that all of the measured values m shown in FIG. 23 are obtained. Otherwise, either one or more additional operations may need to be applied, as in the above-discussed ladder-like quantum-circuit subsystems and z-rotation circuits, or the circuit may need to be retried. For example, a conditional application of an $S^\dagger$ gate 2309 when m=0, as measured in the final $T^\dagger$-gate 2308, deterministically corrects the output qubit to the desired state.

Figure 23B:
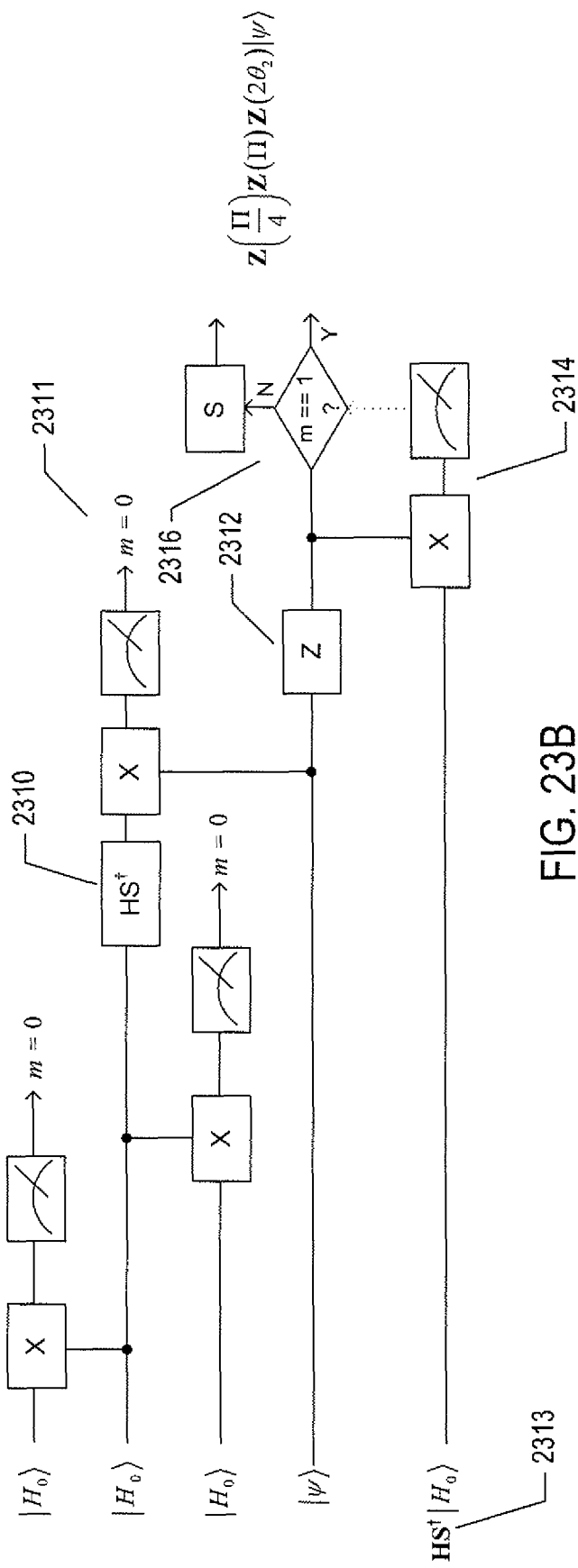

FIG. 23B shows a second implementation of the $V_3$ quantum gate as a quantum circuit featuring elements of the above-discussed quantum circuits in previous subsections. This implementation is similar to the implementation shown in FIG. 23A, with the exception of an HS$^\dagger$ gate 2310 instead of the HSHX gate (2305 in FIG. 23A), use of the measurement m=0 in the z-rotation circuit 2311, an additional Z gate 2312, and use of HS$^\dagger|H_0\rangle$ 2313 as input to the T gate. As with the quantum circuit shown in FIG. 23A, the m=1 outcome of the final T gate 2314 is corrected by application of an S gate 2316.

There are two additional V gates, $V_1$ and $V_2$, that, together with the $V_3$ gate, can be used as a universal basis for quantum circuits:

$$V_1 = \frac{I + 2iX}{\sqrt{5}},$$
$$= \frac{1}{\sqrt{5}}\begin{bmatrix} 1 & 2i \\ 2i & 1 \end{bmatrix},$$
$$V_2 = \frac{I + 2iY}{\sqrt{5}},$$
$$= \frac{1}{\sqrt{5}}\begin{bmatrix} 1 & 2 \\ -2 & 1 \end{bmatrix}.$$

These gates can be implemented from the $V_3$ gate by Clifford operations:

$V_1 = HV_3H,$ $V_2 = SHV_3HS^\dagger.$

Thus, the above described implementations of the $V_3$ gate, along with the above Clifford-group transformations of $V_3$ to $V_1$ and $V_2$, provide a universal quantum-circuit basis.

Although the present invention has been described in terms of particular embodiments, it is not intended that the invention be limited to these embodiments. Modifications within the spirit of the invention will be apparent to those skilled in the art. For example, specific quantum gates that apply specific rotations U to input qubits may be implemented by carrying out pre-computed major rotations. As discussed above, a variety of different types of ladder-like quantum-circuit subsystems may be used to produce qubits with state vectors lying in a Block-sphere plane having various different ϕ angles about a perpendicular rotation axis in addition to the four different ladder-like quantum-circuit subsystems disclosed above. While the currently described subsystems prepare qubits with state vectors in the xz plane, which are then rotated into the xy plane, subsystems that prepare qubits with state vectors in other planes may be alternatively employed. Implementations of target quantum circuits may employ various different numbers and types of resource-state factories and magic-state distilleries.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A V-gate quantum circuit device, comprising:
   a control-qubit-generation quantum-circuit subsystem that generates a first rotation control qubit;
   a first rotation quantum-circuit subsystem that performs a first rotation on a subject qubit input to the first rotation quantum-circuit subsystem along with the rotation control qubit; and
   a second rotation quantum-circuit subsystem that performs a second rotation on the subject qubit input to the second rotation quantum-circuit subsystem along with a control qubit, wherein the control-qubit-generation quantum-circuit subsystem comprises:
   one or more stages, each stage i including
   a stage$_i$ control-qubit input,
   a stage$_i$ subject-qubit input,
   a stage$_i$ measurement output that outputs a physical measurement of an input control qubit following at least one internal two-qubit controlled-gate operation, and
   a stage$_i$ subject-qubit output that outputs the subject qubit following the at least one internal two-qubit controlled-gate operation; and
   a controller that monitors the measurements output from the measurement output of successive stages of the control-qubit-generation quantum-circuit subsystem to determine a number of stages to apply to the subject qubit in order to rotate the state vector of the subject qubit to a specified rotation angle within the plane, wherein each qubit is a physical qubit.

2. The V-gate quantum circuit device of claim 1, wherein the subject qubit input and control qubit input to the first stage of the control-qubit-generation quantum-circuit subsystem both have a state $|H_0\rangle = \cos\theta_0|0\rangle + \sin\theta_0|1\rangle$ where the rotation angle $$\theta_0 = \frac{\pi}{8}.$$

3. The V-gate quantum circuit device of claim 1, wherein each stage of the control-qubit-generation quantum-circuit subsystem further comprises:
   a controlled-NOT gate; and
   a measurement gate that physically measures the state of the control qubit following the at least one internal two-qubit controlled-gate operation and outputs an indication m of the measured state to the measurement output.

4. The V-gate quantum circuit device of claim 3, wherein, when the measurement gate returns an indication m=0 indicating that the control qubit is measured to be in a state $|0\rangle$, the subject qubit is in a state $|H_{i+1}\rangle$, with the state-vector representing the state $|H_{i+1}\rangle$ having a rotation angle $\theta_{i+1}$; and
   wherein, when the measurement gate returns an indication m=1 indicating that the control qubit is measured to be in a state $|1\rangle$, the subject qubit is in a state $|H_{i-1}\rangle$, with the state-vector representing the state $|H_{i-1}\rangle$ having a rotation angle $\theta_{i-1}$,
   wherein $\theta_j$ represents the rotation angle produced from a successful application of stage$_{i-1}$.

5. The V-gate quantum circuit device of claim 4, wherein the measurement gate returns an indication m=0 with a probability p greater than or equal to 0.75 and returns an indication m=1 with a probability p less than or equal to 0.25 at each stage.

6. The V-gate quantum circuit device of claim 1, wherein the subject qubit output from a stage, subject-qubit output of the control-qubit-generation is input to a stage$_{i+1}$ subject-qubit input.

7. The V-gate quantum circuit device of claim 6, wherein, after application of a next stage i of the quantum-circuit subsystem to a subject qubit input to the stage i in state $|H_i\rangle$, when the measurement gate of the stage returns an indication m=0 indicating that the control qubit is measured to be in a state $|0\rangle$, the subject qubit is in state $|H_{i+1}\rangle$ and has a rotation angle $\theta_{i+1}^k$ characteristic of the subject qubit input to the first stage of the quantum-circuit subsystem, k, and of the stage i.

8. The V-gate quantum circuit device of claim 7, wherein the controller:
   initially determines a number of stages j to apply to the subject qubit in order to rotate the state vector of the subject qubit to a specified rotation angle; and
   while j is greater than 0,
   applies a next stage to the subject qubit,
   when the measurement value m output after applying the next stage is 0, decrements j, and
   when the measurement value m output after applying the next stage is 1, increments j.

9. The V-gate quantum circuit device of claim 1, wherein the control-qubit-generation quantum-circuit subsystem generates a control qubit in state $|H_2\rangle$.

10. The V-gate quantum circuit device of claim 1, wherein the first rotation quantum-circuit subsystem and the second rotation quantum-circuit subsystem each further comprises:
a controlled-NOT; and
a measurement gate.

11. The V-gate quantum circuit device of claim 10 further comprising one of an $HS^\dagger$ gate and an HSHX gate that operates on the control qubit in state $|H_2\rangle = \cos\theta_2 |0\rangle + \sin\theta_2 |1\rangle$ to prepare a first-rotation-quantum-circuit subsystem control qubit, wherein $\theta_2$ represents the rotation angle produced from a successful application of stage$_1$.

12. The V-gate quantum circuit device of claim 11, wherein the first rotation quantum-circuit subsystem rotates the subject qubit by $$-\frac{\pi}{2} + 2\theta_2$$

radians; and
wherein the second rotation quantum-circuit subsystem rotates the subject qubit by $$-\frac{\pi}{4}$$

radians.

13. The V-gate quantum circuit device of claim 10,
wherein the first rotation quantum-circuit subsystem rotates the subject qubit by $2\theta_2$ radians, $\theta_2$ representing the rotation angle produced from a successful application of stage$_1$;
wherein the second rotation quantum-circuit subsystem rotates the subject qubit by $\pi$ radians; and
further comprising a third rotation quantum-circuit subsystem that rotates the subject qubit by $$\frac{\pi}{4}$$

radians.

14. A method for carrying out a V-gate operation on a subject qubit implemented in hardware, the method comprising:
generating a control qubit using at least one quantum circuit subsystem;
applying a quantum gate to the control qubit to prepare a first rotation control qubit;
performing a first rotation on the subject qubit using the first rotation control qubit;
performing a second rotation on the subject qubit using a second rotation control qubit;
performing a physical measurement of an input control qubit following at least one of the rotations; and
monitoring, using a controller, the physical measurements to determine a number of stages to apply to the subject qubit in order to rotate the state vector of the subject qubit to a specified rotation angle within the plane, wherein each qubit is a physical qubit and the generated control qubit is in state $|H_2\rangle = \cos\theta_2|0\rangle + \sin\theta_2|1\rangle$ and $$2\theta_2 + \frac{\pi}{4} = \cos^{-1}\frac{3}{5}.$$

15. The method of claim 14, wherein the quantum gate is one of an $HS^\dagger$ gate and an HSHX gate.

16. The method of claim 15,
wherein performing the first rotation on the subject qubit using the first rotation control qubit further comprises performing a rotation of $$-\frac{\pi}{2} + 2\theta_2$$

radians; and
wherein performing the second rotation on the subject qubit further comprises performing a rotation of $$-\frac{\pi}{4}$$

radians.

17. The method of claim 15,
wherein performing the first rotation on the subject qubit using the first rotation control qubit further comprises performing a rotation of $2\theta_2$ radians;
wherein performing the second rotation on the second subject qubit further comprises performing a rotation of $\pi$ radians.

18. The method of claim 17, further comprising performing a third rotation of $$\frac{\pi}{4}$$

radians.

* * * * *